US007716490B2

(12) United States Patent
Kanai

(10) Patent No.: US 7,716,490 B2
(45) Date of Patent: *May 11, 2010

(54) ACCESS CONTROL APPARATUS, ACCESS CONTROL METHOD, ACCESS CONTROL PROGRAM, RECORDING MEDIUM, ACCESS CONTROL DATA, AND RELATION DESCRIPTION DATA

(75) Inventor: Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1045 days.

This patent is subject to a terminal disclaimer.

(21) Appl. No.: 11/413,211

(22) Filed: Apr. 28, 2006

(65) Prior Publication Data

US 2006/0265599 A1 Nov. 23, 2006

(30) Foreign Application Priority Data

May 17, 2005 (JP) ............................ 2005-144602

(51) Int. Cl.
*G06F 21/00* (2006.01)

(52) U.S. Cl. ...................................... 713/182; 713/185

(58) Field of Classification Search ....................... None
See application file for complete search history.

(56) References Cited

U.S. PATENT DOCUMENTS 6,023,765 A * 2/2000 Kuhn ............................ 726/4
6,044,466 A * 3/2000 Anand et al. ................... 726/1
2001/0002472 A1 5/2001 Kanai et al.
2001/0023421 A1 9/2001 Numao et al.
2004/0125402 A1 7/2004 Kanai et al.
2004/0128555 A1 7/2004 Saitoh et al.
2005/0021980 A1 1/2005 Kanai
2005/0114677 A1 5/2005 Kanai
2005/0141010 A1 6/2005 Kanai
2006/0047481 A1 3/2006 Kanai
2006/0242688 A1 * 10/2006 Paramasivam et al. ......... 726/5

FOREIGN PATENT DOCUMENTS

JP 3546787 4/2004
JP 2004-152261 5/2004

OTHER PUBLICATIONS

U.S. Appl. No. 11/624,447, filed Jan. 18, 2007, Kanai.
U.S. Appl. No. 11/096,078, filed Mar. 30, 2005, Yoichi Kanai.

* cited by examiner

*Primary Examiner*—Pramila Parthasarathy
(74) *Attorney, Agent, or Firm*—Oblon, Spivak, McClelland, Maier & Neustadt, L.L.P.

(57) ABSTRACT

An access control apparatus is disclosed that controls access to a predetermined resource. The access control apparatus includes entity relationship definition information defining a predetermined relationship of a first entity attempting to access the predetermined resource with a second entity, indirect access control information defining an access right to the predetermined resource based on the predetermined relationship, and an indirect access right determining unit that detects the second entity with which the first entity has the predetermined relationship based on the entity relationship definition information, and determines an access right of the first entity based on the predetermined relationship with the detected second entity and the indirect access control information.

16 Claims, 36 Drawing Sheets

| DOCUMENT ID | DECRYPTION KEY | DOMAIN | DOCUMENT CATEGORY | CONFIDENTIAL LEVEL | RELATED PERSONS /PRINCIPAL |
|---|---|---|---|---|---|
| SEC00123 | 89FECA8D2B | FINANCE | FINANCIAL | SECRET | kain12 |

FIG.6

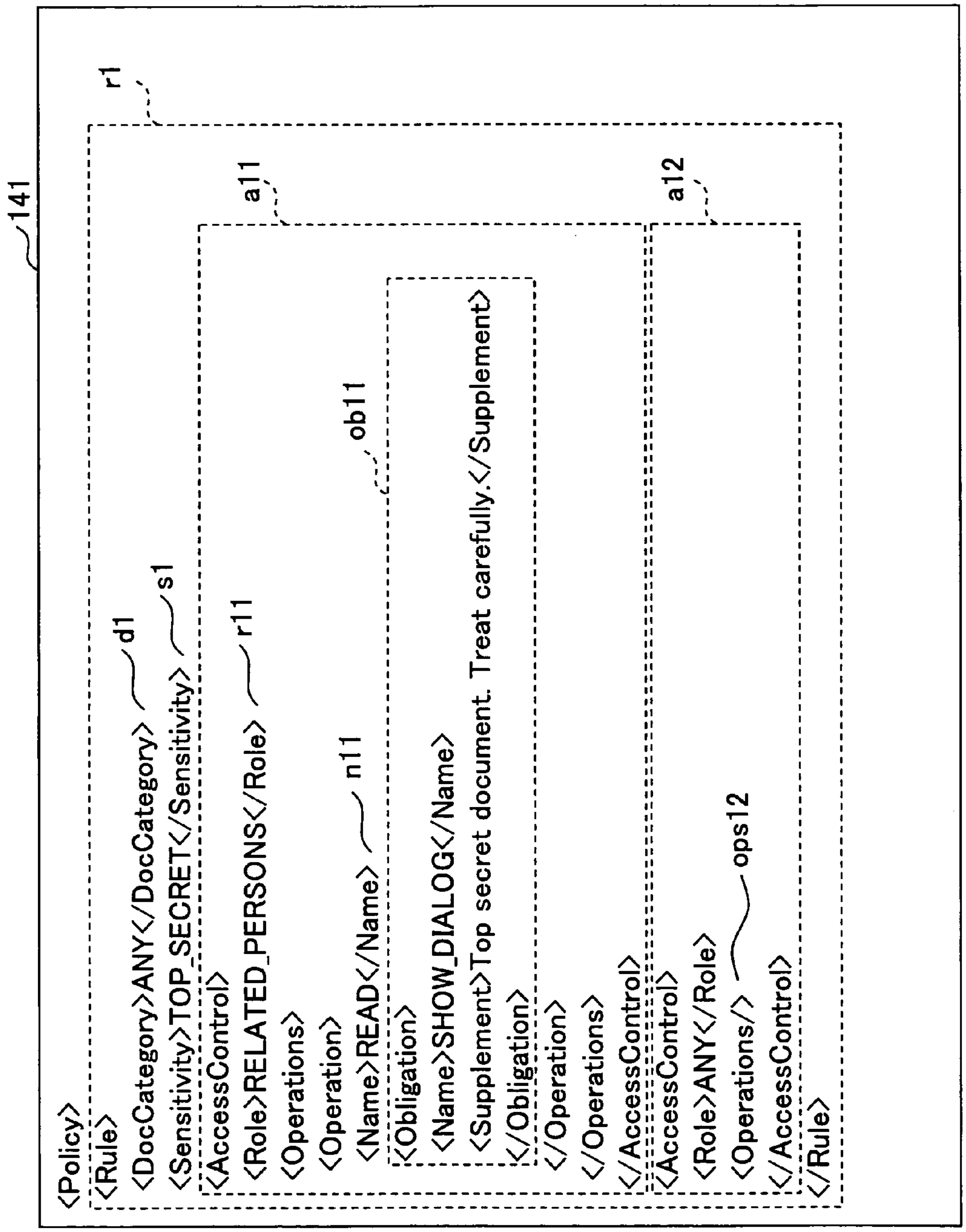

```
<Policy>
  <Rule>
    <DocCategory>ANY</DocCategory>
    <Sensitivity>TOP_SECRET</Sensitivity>
    <AccessControl>
      <Role>RELATED_PERSONS</Role>
      <Operations>
        <Operation>
          <Name>READ</Name>
          <Obligation>
            <Name>SHOW_DIALOG</Name>
            <Supplement>Top secret document. Treat carefully.</Supplement>
          </Obligation>
        </Operation>
      </Operations>
    </AccessControl>
    <AccessControl>
      <Role>ANY</Role>
      <Operations/>
    </AccessControl>
  </Rule>
</Policy>
```

141 r2

```
<Rule>
 <DocCategory>HUMAN_RESOURCE</DocCategory>   d2
 <Sensitivity>SECRET</Sensitivity>
 <AccessControl>
  <Role>PRINCIPAL</Role>   r21
  <Operations>
   <Operation>
    <Name>READ</Name>
    <Obligation>
     <Name>SHOW_DIALOG</Name>
     <Supplement>Personnel information. Treat carefully until announced.</Supplement>
    </Obligation>
   </Operation>
   <Operation>
    <Name>PRINT</Name>
    <Obligation>
     <Name>STAMP</Name>
     <Supplement>Confidential Stamp (Personnel)</Supplement>
    </Obligation>
   </Operation>
   <Operation>
    <Name>HARDCOPY</Name>
    <Obligation>
     <Name>PRINT_ALARM</Name>
     <Supplement>Copied by %u</Supplement>
    </Obligation>
   </Operation>
  </Operations>
 </AccessControl>
 <AccessControl>
  <Role>ANY</Role>
  <Operations/>
 </AccessControl>
</Rule>
```

FIG.7

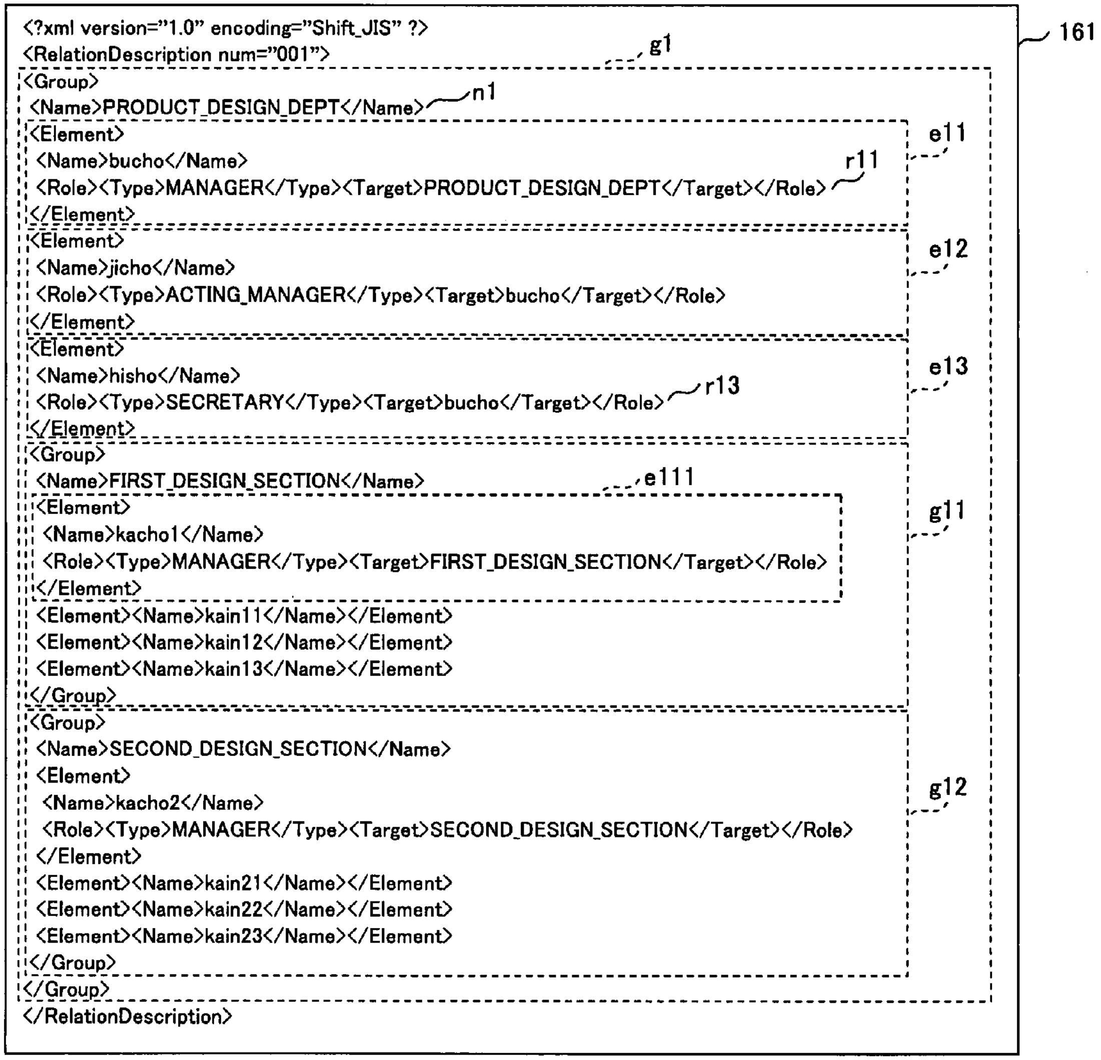

FIG.11

```
<?xml version="1.0" encoding="Shift_JIS" ?>
<RelationDescription num="001">
 <Group>                                                            ─ n1
  <Name>PRODUCT_DESIGN_DEPT</Name>
  <Element>                                                         ─ e11
   <Name>bucho</Name>
   <Role><Type>MANAGER</Type><Target>PRODUCT_DESIGN_DEPT</Target></Role>  ─ r11
  </Element>
  <Element>                                                         ─ e12
   <Name>jicho</Name>
   <Role><Type>ACTING_MANAGER</Type><Target>bucho</Target></Role>
  </Element>
  <Element>                                                         ─ e13
   <Name>hisho</Name>
   <Role><Type>SECRETARY</Type><Target>bucho</Target></Role>         ─ r13
  </Element>
  <Group>                                                            ─ g11
   <Name>FIRST_DESIGN_SECTION</Name>
   <Element>                                                         ─ e111
    <Name>kacho1</Name>
    <Role><Type>MANAGER</Type><Target>FIRST_DESIGN_SECTION</Target></Role>
   </Element>
   <Element><Name>kain11</Name></Element>
   <Element><Name>kain12</Name></Element>
   <Element><Name>kain13</Name></Element>
  </Group>
  <Group>                                                            ─ g12
   <Name>SECOND_DESIGN_SECTION</Name>
   <Element>
    <Name>kacho2</Name>
    <Role><Type>MANAGER</Type><Target>SECOND_DESIGN_SECTION</Target></Role>
   </Element>
   <Element><Name>kain21</Name></Element>
   <Element><Name>kain22</Name></Element>
   <Element><Name>kain23</Name></Element>
  </Group>
 </Group>
</RelationDescription>
```

FIG.12

```
                                                                     171
<?xml version="1.0" encoding="Shift_JIS" ?>
<RelationDescription num="002">                                       g1
<Group>
 <Name>BUILDING_A</Name> n1                                     g11
 <Group>
  <Name>1F</Name> n11
  <Element>...</Element>
  ...
 </Group>
 ...                                                                 g12
 <Group>
  <Name>7F</Name> n12                                           g121
  <Group>
   <Name>CALL_CENTER</Name> n121                        e1211
   <Element>
    <Name>YAMADA</Name>
    <Role><Type>SAME_PARTITION</Type>           } r12111
     <Target>CALL_CENTER</Target></Role>                 r12112
    <Role><Type>SAME_FLOOR</Type><Target>7F</Target></Role>          r12113
    <Role><Type>SAME_BUILDING</Type><Target>BUILDING_A</Target></Role>
   </Element>
   <Element>
    <Name>TANAKA</Name>
    <Role><Type>SAME_PARTITION</Type>
     <Target>CALL_CENTER</Target></Role>
    <Role><Type>SAME_FLOOR</Type><Target>7F</Target></Role>
    <Role><Type>SAME_BUILDING</Type><Target>BUILDING_A</Target></Role>
   </Element>
   ...
  </Group>                                                           g122
  <Group>
   <Name>COMPUTER_ROOM</Name> n122
   <Element>
    <Name>SATO</Name>
    <Role><Type>SAME_PARTITION</Type>
     <Target>COMPUTER_ROOM</Target></Role>
    <Role><Type>SAME_FLOOR</Type><Target>7F</Target></Role>
    <Role><Type>SAME_BUILDING</Type><Target>BUILDING_A</Target></Role>
   </Element>
   <Element>
    <Name>FUJITA</Name>
    <Role><Type>SAME_PARTITION</Type>
     <Target>COMPUTER_ROOM</Target></Role>
    <Role><Type>SAME_FLOOR</Type><Target>7F</Target></Role>
    <Role><Type>SAME_BUILDING</Type><Target>BUILDING_A</Target></Role>
   </Element>
   ...
  </Group>
 </Group>
</Group>
</RelationDescription>
```

```
<?xml version="1.0" encoding="Shift_JIS" ?>
<Policy>
 <Rule>                                                          r1
  <DocCategory>HUMAN_RESOURCE</DocCategory>  d1
  <Sensitivity>SECRET</Sensitivity>  s1
  <AccessControl>
   <Role Relative=TRUE num="001">MANAGER</Role>  r1
   <SameAsTheRoleTarget/>  t1
  </AccessControl>
 </Rule>
 <Rule>                                                          r2
  <DocCategory>CUSTOMER_INFO</DocCategory>
  <Sensitivity>SECRET</Sensitivity>
  <AccessControl>
   <Role Relative=TRUE num="002">SAME_PARTITION</Role>
   <SameAsTheRoleTarget/>
  </AccessControl>
 </Rule>
 <Rule>                                                          r3
  <DocCategory>ANY</DocCategory>
  <Sensitivity>SECRET</Sensitivity>
  <AccessControl>                                    a31
   <Role Relative=TRUE num="001">MANAGER</Role>
   <SameAsTheRoleTarget/>
  </AccessControl>
  <AccessControl>                                    a32
   <Role Relative=TRUE num="001">SECRETARY</Role>
   <Operations>
    <Operation>
     <Name>READ</Name>
     <Obligation>
      <Name>SHOW_DIALOG</Name>
      <Supplement>(To secretary) Secret document. Treat carefully.</Supplement>
     </Obligation>
    </Operation>
   </Operations>
  </AccessControl>
  <AccessControl>
   <Role Relative=TRUE num="001">ACTING_MANAGER</Role>
   <SameAsTheRoleTarget/>
  </AccessControl>
 </Rule>
  :
  :

</Policy>
```

FIG.20

```
<Organization>
 <Name>PRODUCT_DESIGN_DEPT</Name>
 <Members>
  <Person>
   <Name>bucho</Name><Role><Type>MANAGER</Type></Role>
  </Person>
  <Person>
   <Name>jicho</Name>
   <Role><Type>ACTING_MANAGER</Type><Target>bucho</Target></Role>
  </Person>
  <Person>
   <Name>hisho</Name>
   <Role><Type>SECRETARY</Type><Target>bucho</Target></Role>
  </Person>
 </Members>
 <Organization>
  <Name>FIRST_DESIGN_SECTION</Name>
  <Members>
   <Person>
    <Name>kacho1</Name><Role><Type>MANAGER</Type></Role>
   </Person>
   <Person><Name>kain11</Name></Person>
   <Person><Name>kain12</Name></Person>
   <Person><Name>kain13</Name></Person>
  </Members>
 </Organization>
 <Organization>
  <Name>SECOND_DESIGN_SECTION</Name>
  <Members>
   <Person>
    <Name>kacho2</Name><Role><Type>MANAGER</Type></Role>
   </Person>
   <Person><Name>kain21</Name></Person>
   <Person><Name>kain22</Name></Person>
   <Person><Name>kain23</Name></Person>
  </Members>
 </Organization>
</Organization>
```

```
<Policy>
<Rule>
 <DocCategory>ANY</DocCategory>
 <Sensitivity>TOP_SECRET</Sensitivity>
 <AccessControl>
  <Role>RELATED_PERSONS</Role>
      :
  <Role>ANY</Role>
  <Operations/>
 </AccessControl>
</Rule>
<Rule>
 <DocCategory>HUMAN_RESOURCE</DocCategory>
 <Sensitivity>SECRET</Sensitivity>
 <AccessControl>
  <Role>PRINCIPAL</Role>
      :
 </AccessControl>
 <AccessControl>
  <Role Relative=TRUE>MANAGER</Role>
  <Operations>
   <SameAs>PRINCIPAL</SameAs>
  </Operations>
 </AccessControl>
 <AccessControl>
  <Role>ANY</Role>
  <Operations/>
 </AccessControl>
</Rule>
``` r1 r2 a21 a22 s22

```
<Rule>
 <DocCategory>ANY</DocCategory>
 <Sensitivity>SECRET</Sensitivity>
 <AccessControl>
  <Role>RELATED_PERSONS</Role>
      :
 </AccessControl>
 <AccessControl>
  <Role Relative=TRUE>MANAGER</Role>
  <Operations>
   <Operation>
    <Name>READ</Name>
    <Obligation>
     <Name>SHOW_DIALOG</Name>
     <Supplement>Secret document distributed to persons in charge. Treat carefully.</Supplement>
    </Obligation>
   </Operation>
  </Operations>
 </AccessControl>
 <AccessControl>
  <Role Relative=TRUE>SECRETARY</Role>
  <Operations>
   <Operation>
    <Name>READ</Name>
    <Obligation>
     <Name>SHOW_DIALOG</Name>
     <Supplement>(To secretary) Secret document. Treat carefully.</Supplement>
    </Obligation>
   </Operation>
  </Operations>
 </AccessControl>
 <AccessControl>
  <Role Relative=TRUE>ACTING_MANAGER</Role>
  <Operations>
   <Operation>
    <Name>READ</Name>
    <Obligation>
     <Name>SHOW_DIALOG</Name>
     <Supplement>(To agent) Secret document. Treat carefully.</Supplement>
    </Obligation>
   </Operation>
  </Operations>
 </AccessControl>
 <AccessControl>
  <Role>ANY</Role>
  <Operations/>
 </AccessControl>
</Rule>
</Policy>
```

```
<Policy>
 <Rule>
  <DocCategory>ANY</DocCategory>
  <Sensitivity>TOP_SECRET</Sensitivity>
  <AccessControl>
   <Role>RELATED_PERSONS</Role>    r11        r1
     :
  </AccessControl>
  <AccessControl>
   <Role>ANY</Role>
   <Operations/>
  </AccessControl>
 </Rule>
 <Rule>
  <DocCategory>HUMAN_RESOURCE</DocCategory>
  <Sensitivity>SECRET</Sensitivity>
  <AccessControl>
   <Role>PRINCIPAL</Role>    r21
     :                                  r2
  </AccessControl>
  <AccessControl>
   <Role>ANY</Role>
   <Operations/>
  </AccessControl>
 </Rule>
 <Rule>
  <DocCategory>ANY</DocCategory>
  <Sensitivity>SECRET</Sensitivity>
  <AccessControl>
   <Role>RELATED_PERSONS</Role>    r31
     :                                  r3
  </AccessControl>
  <AccessControl>
   <Role>ANY</Role>
   <Operations/>
  </AccessControl>
 </Rule>
</Policy>
```

```
<Policy>                                                              r1
 <Rule>
  <DocCategory>HUMAN_RESOURCE</DocCategory>
  <Sensitivity>SECRET</Sensitivity>                                   a11
  <AccessControl>
   <Role>PRINCIPAL</Role>
   <Operations>
    <Operation>
     <Name>READ</Name>
     <Obligation>
      <Name>SHOW_DIALOG</Name>
      <Supplement>Personnel information. Treat carefully until announced.</Supplement>
     </Obligation>
    </Operation>
    <Operation>
     <Name>PRINT</Name>
     <Obligation>
      <Name>STAMP</Name>
      <Supplement>Confidential Stamp (Personnel)</Supplement>
     </Obligation>
    </Operation>
    <Operation>
     <Name>HARDCOPY</Name>
     <Obligation>
      <Name>PRINT_ALARM</Name>
      <Supplement>Copied by %u</Supplement>
     </Obligation>
    </Operation>
   </Operations>
  </AccessControl>
  <AccessControl>
   <Role Relative=TRUE>MANAGER</Role>
   <Operations>
    <SameAs>PRINCIPAL</SameAs>   s1
   </Operations>
  </AccessControl>
 </Rule>                                                              a12
```

<Rule>
<DocCategory>ANY</DocCategory>
<Sensitivity>SECRET</Sensitivity>
<AccessControl>
<Role Relative=TRUE>MANAGER</Role>
<Operations>
<Operation>
<Name>READ</Name>
<Obligation>
<Name>SHOW_DIALOG</Name>
<Supplement>Secret document distributed to persons in charge. Treat carefully.</Supplement>
</Obligation>
</Operation>
</Operations>
</AccessControl>
<AccessControl>
<Role Relative=TRUE>SECRETARY</Role>
<Operations>
<Operation>
<Name>READ</Name>
<Obligation>
<Name>SHOW_DIALOG</Name>
<Supplement>(To secretary) Secret document. Treat carefully.</Supplement>
</Obligation>
</Operation>
</Operations>
</AccessControl>
<AccessControl>
<Role Relative=TRUE>ACTING_MANAGER</Role>
<Operations>
<Operation>
<Name>READ</Name>
<Obligation>
<Name>SHOW_DIALOG</Name>
<Supplement>(To agent) Secret document. Treat carefully.</Supplement>
</Obligation>
</Operation>
</Operations>
</AccessControl>
</Rule>
</Policy>

```
<Policy>
 <Rule>                                                    r1
  <DocCategory>HUMAN_RESOURCE</DocCategory>
  <Sensitivity>SECRET</Sensitivity>
  <AccessControl>
   <Role Relative=TRUE>MANAGER</Role>
   <Operations>
    <SameAs>PRINCIPAL</SameAs>   s11
   </Operations>
  </AccessControl>
 </Rule>
 <Rule>                                                    r2
  <DocCategory>ANY</DocCategory>
  <Sensitivity>SECRET</Sensitivity>
  <AccessControl>
   <Role Relative=TRUE>MANAGER</Role>
   <Operations>
    <SameAs>PRINCIPAL</SameAs>   s21
   </Operations>
  </AccessControl>
  <AccessControl>
   <Role Relative=TRUE>SECRETARY</Role>
   <Operations>
    <SameAs>PRINCIPAL</SameAs>   s22
   </Operations>
  </AccessControl>
  <AccessControl>
   <Role Relative=TRUE>ACTING_MANAGER</Role>
   <Operations>
    <SameAs>PRINCIPAL</SameAs>   s23
   </Operations>
  </AccessControl>
 </Rule>
</Policy>
```

```
<Policy>
 <Rule>
  <DocCategory>ANY</DocCategory>
  <Sensitivity>TOP_SECRET</Sensitivity>
  <AccessControl>
   <Role>RELATED_PERSONS</Role>
      :
  </AccessControl>
  <AccessControl>
   <Role>ANY</Role>
   <Operations/>
  </AccessControl>
 </Rule>
 <Rule>
  <DocCategory>IT_SYSTEMS</DocCategory>
  <Sensitivity>SECRET</Sensitivity>
  <AccessControl>
   <Role>RELATED_PERSONS</Role>
      :
  </AccessControl>
  <AccessControl>
   <Role Relative=TRUE>SAME_PARTITION</Role>
   <Operations>
    <SameAs>PRINCIPAL</SameAs>
   </Operations>
  </AccessControl>
  <AccessControl>
   <Role>ANY</Role>
   <Operations/>
  </AccessControl>
 </Rule>
```

FIG.35

```
<Rule>
 <DocCategory>CUSTOMER_INFO</DocCategory>
 <Sensitivity>ANY</Sensitivity>
 <AccessControl>
  <Role>PRINCIPAL</Role>
     :
 </AccessControl>
 <AccessControl>
  <Role Relative=TRUE>SAME_FLOOR</Role>
  <Operations>
   <Operation>
    <Name>READ</Name>
    <Obligation>
     <Name>SHOW_DIALOG</Name>
     <Supplement>Customer information. Treat carefully</Supplement>
    </Obligation>
   </Operation>
  </Operations>
 </AccessControl>
 <AccessControl>
  <Role>ANY</Role>
  <Operations/>
 </AccessControl>
</Rule>
</Poicy>
```

ACCESS CONTROL APPARATUS, ACCESS CONTROL METHOD, ACCESS CONTROL PROGRAM, RECORDING MEDIUM, ACCESS CONTROL DATA, AND RELATION DESCRIPTION DATA

BACKGROUND OF THE INVENTION

1. Field of the Invention

The present invention generally relates to an access control apparatus, an access control method, an access control program, a recording medium, access control data, and relation description data, and specifically relates to an access control apparatus, an access control method, an access control program, a recording medium, access control data, and relation description data for controlling access to a predetermined resource.

2. Description of the Related Art

With the advancement in computer technology, it has become common to save and manage various information items as electronic documents. Electronic documents are, however, vulnerable in terms of security. For example, the electronic documents can be easily copied compared to paper documents. In view of that, techniques to ensure security of the electronic documents have been proposed.

One example may be XACML (extensible Access Control Markup Language) 2.0, which is a format for describing access control policies proposed as an industry standard by OASIS (Organization for the Advancement of Structured Information Standards) (see, for example, http://www.oasis-open.org/committees/tc_home.php?wg_abbrev=xacml). XACML can describe access control policies that define which type of access is permitted to which document and which obligation is imposed upon permitting access. However, XACML is merely a description format for access control policies, and methods for ensuring security using XACML are not specified.

DRM (Digital Rights Management) technology is designed to prevent copying of electronic documents and may be used when, for example, distributing confidential document files. This technology is embodied in various forms. Among those, there is a method that encrypts a document to be distributed and allows only authenticated users to have a decryption key, thereby preventing unauthorized disclosure of information in distributed confidential documents.

In addition to the above described technologies, various other security technologies have been proposed (e.g. Japanese Patent No. 3546787). This indicates a high concern for security of electronic documents.

However, in actual use in organizations such as companies, a system that determines whether access to documents is permitted based on access control information defined for each combination of documents and users or groups, i.e., based on definitions such as "who is permitted to read which document" might be inconvenient.

For example, a person b1 in a department B receives a confidential document from a department A and needs to show that document to his/her boss b2 or his/her colleague b3 for consultation or for giving a presentation. If read rights for the boss b2 and the colleague b3 are not attached to the confidential document received from the department A, the person b1 needs to request the department A to attach read rights for the boss b2 and the colleague b3 to the document. Then the department A sends the confidential document again with the read rights for the boss b2 and the colleague b3.

Such a process is very troublesome for both the department A and the person b1, and is unacceptable as an operating cost for ensuring security. However, allowing the person b1 to freely give read rights to unrelated people might lead to unauthorized distribution of the document.

The department A needs to prevent such unauthorized distribution of the confidential document by the person b1, but it is difficult for the department A to know in advance who the boss of the person b1 is. It is also difficult for the department A to know who the colleague usually working with the person b1 is. Therefore, the department A cannot decide to whom to give read rights in advance.

SUMMARY OF THE INVENTION

The present invention may solve at least one or more of the above problems. The present invention is directed to provide an access control apparatus, an access control method, an access control program, a recording medium, access control data, and relation description data for flexibly controlling access to a predetermined resource.

According to an aspect of the present invention, there is provided an access control apparatus that controls access to a predetermined resource, the access control apparatus comprising entity relationship definition information defining a predetermined relationship of a first entity attempting to access the predetermined resource with a second entity, indirect access control information defining an access right to the predetermined resource based on the predetermined relationship, and an indirect access right determining unit that detects the second entity with which the first entity has the predetermined relationship based on the entity relationship definition information, and determines an access right of the first entity based on the predetermined relationship with the detected second entity and the indirect access control information.

The present invention may be embodied as an access control method for use in the above-described access control apparatus, an access control program that causes a computer to execute the access control method, or a recording medium with the access control program recorded therein.

BRIEF DESCRIPTION OF THE DRAWINGS

FIG. 3 shows an example of a security attribute table of a security attribute database;

FIGS. 6-8 show an example of a policy description in policy data according to the first embodiment;

FIG. 11 shows an example of a user relation description based on an organizational structure according to the first embodiment;

FIG. 12 shows an example of a user relation description based on a seating layout according to the first embodiment;

FIG. 13 shows an example of an indirect policy description in indirect policy data according to the first embodiment;

FIG. 20 shows an example of a user relation description based on an organizational structure according to the second embodiment;

FIGS. 21 and 22 show an example of a policy description in policy data according to the second embodiment;

FIG. 25 shows an example of a policy description in policy data according to the third embodiment;

FIGS. 26 and 27 show an example of an indirect policy description in indirect policy data according to the second embodiment;

FIG. 29 shows an example of an indirect policy description in indirect policy data according to the fourth embodiment;

FIGS. 34 and 35 show an example of a policy description in policy data corresponding to a seating layout;

DETAILED DESCRIPTION OF THE PREFERRED EMBODIMENT

The following describes preferred embodiments of the present invention with reference to the accompanying drawings. In the following embodiments of the present invention, electronic documents are examples of predetermined resources, and users are examples of entities attempting to access the predetermined resources. However, the predetermined resources are not limited to electronic documents, but may be various other resources (network devices such as storage units, computers, or printers) connected to networks. The entities attempting to access the predetermined resources may be identified by host names or the like of personal computers or the like in place of user names (account names).

Figure 1:
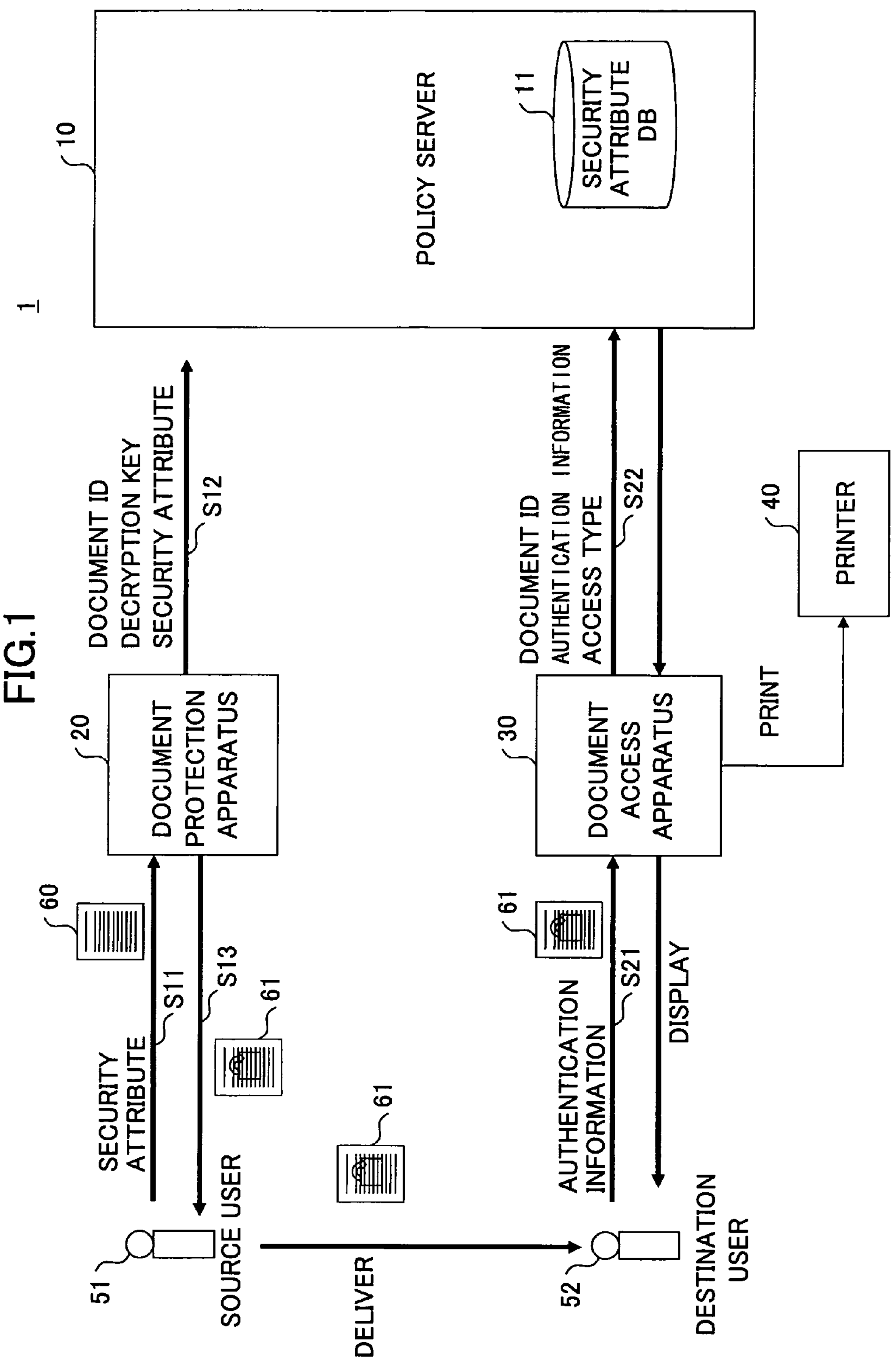
FIG. 1 is a schematic configuration diagram of a document access control system according to an embodiment of the present invention.

FIG. 1 is a schematic configuration diagram of a document access control system 1 according to an embodiment of the present invention. With reference to FIG. 1, the document access control system 1 comprises a policy server 10, a document protection apparatus 20, and a document access apparatus 30, which are connected to each other via a LAN (Local Area Network) or a network such as the Internet (which may or may not be wireless).

The document protection apparatus 20 is a computer such as a personal computer, in which a program (document protection program) that performs processing (hereinafter referred to as "document protection processing") for protecting a document to be delivered from a source user 51 to another user (e.g. destination user 52) is installed. A document on which document protection processing by the document protection program has performed is hereinafter referred to as a "protected document".

The document access apparatus 30 is a computer such as a personal computer, in which a program (document access program) 31 is installed that accesses the protected document delivered from the source user 51 for operations such as editing, displaying, and printing.

The policy server 10 is a computer such as a personal computer, and is adapted to control access to the protected document.

When the source user 51 inputs an original document 60 and a security attribute to be attached to the original document 60 to the document protection program in the document protection apparatus 20 of FIG. 1 (S11), the document protection program performs document protection processing on the original document 60. The security attribute is information about attributes of the original document 60 to be referred to when the policy server 10 performs access control, such as the domain to which the original document 60 belongs, the document category, the confidential level, and related persons.

Figure 2:
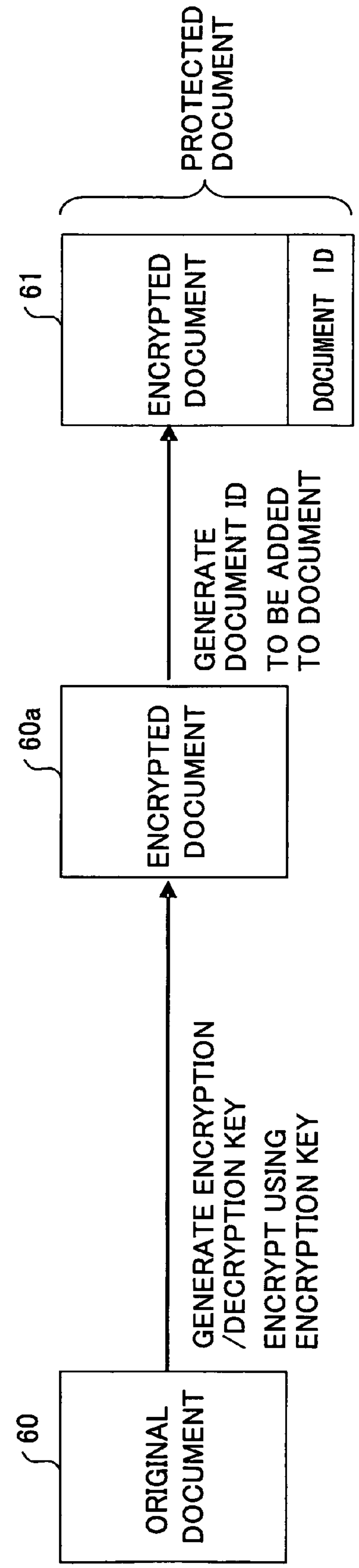
FIG. 2 is a diagram for explaining document protection processing.

FIG. 2 is a diagram for explaining the document protection processing. With reference to FIG. 2, the document protection program generates an encryption key and a decryption key, and encrypts the original document 60 using the encryption key so as to generate an encrypted document 60*a*. Then, the document protection program generates a document ID for identifying the original document 60 as unique identification information, and generates a protected document 61 by attaching the document ID to the encrypted document 60*a*.

Referring back to FIG. 1, the document protection program requests, after performing the document protection processing, the policy server 10 to register the document ID, the decryption key and the security attribute (S12), and sends the generated protected document 61 to the source user 51 (S13). The expression "to send to the user" as used herein indicates, for example, to store the generated protected document 61 in a storage area that can be recognized by the source user 51.

The policy server 10 registers the security attribute of which registration is requested in a security attribute database 11 so as to hold the security attribute.

FIG. 3 shows an example of a security attribute table 111 of the security attribute database 11. In the example of the security attribute table 111 shown in FIG. 3, a document ID, a decryption key, a domain, a document category, a confidential level, and a related person/principal are registered. The related person/principal may include, for example, a creator of the original document 60 and the source user 51 (the creator and the source user 51 may be the same person).

With the above-described steps, a process of generating the protected document 61 is completed. Thus, the source user 51 can deliver the protected document 61 to another user such as the destination user 52.

The following describes operations to be performed when the destination user 52 who has received the protected document 61 attempts to access the protected document 61.

The destination user 52 inputs authentication information (e.g. user name and password) for user authentication and the protected document 61 to the document access program 31 in the document access apparatus 30, and requests an operation such as displaying or printing the protected document 61 (S21).

The document access program 31 acquires the document ID contained in the input protected document 61, and sends the acquired document ID, the input user authentication information, and the type of the requested access (displaying or printing) to the policy server 10 (S22). The policy server 10 determines whether to permit the access specified by the access type, and sends the determination result, an obligation, and a decryption key to the document access program 31 if the policy server 10 determines to permit the access. The term "obligation" as used herein indicates a task, such as recording a log, that should be performed upon accessing a document in order to ensure security. Determination of access permission by the policy server 10 is described below in greater detail.

If the access is not permitted, the document access program 31 reports to the destination user 52 that the requested access is not permitted, and thus the process ends. If, on the other hand, the access is permitted, the document access program 31 decrypts the encrypted document 60*a* contained in the protected document 61 to the original document 60 using the received decryption key. The document access program 31 then performs the requested access operation (e.g. displaying or printing) by, for example, rendering the original document 60. If an obligation is imposed, the document access program 31 performs the obligation along with performing the access operation.

The following describes in more detail the operations to be performed upon accessing the protected document 61 that are mentioned above with reference to FIG. 1.

Figure 4:
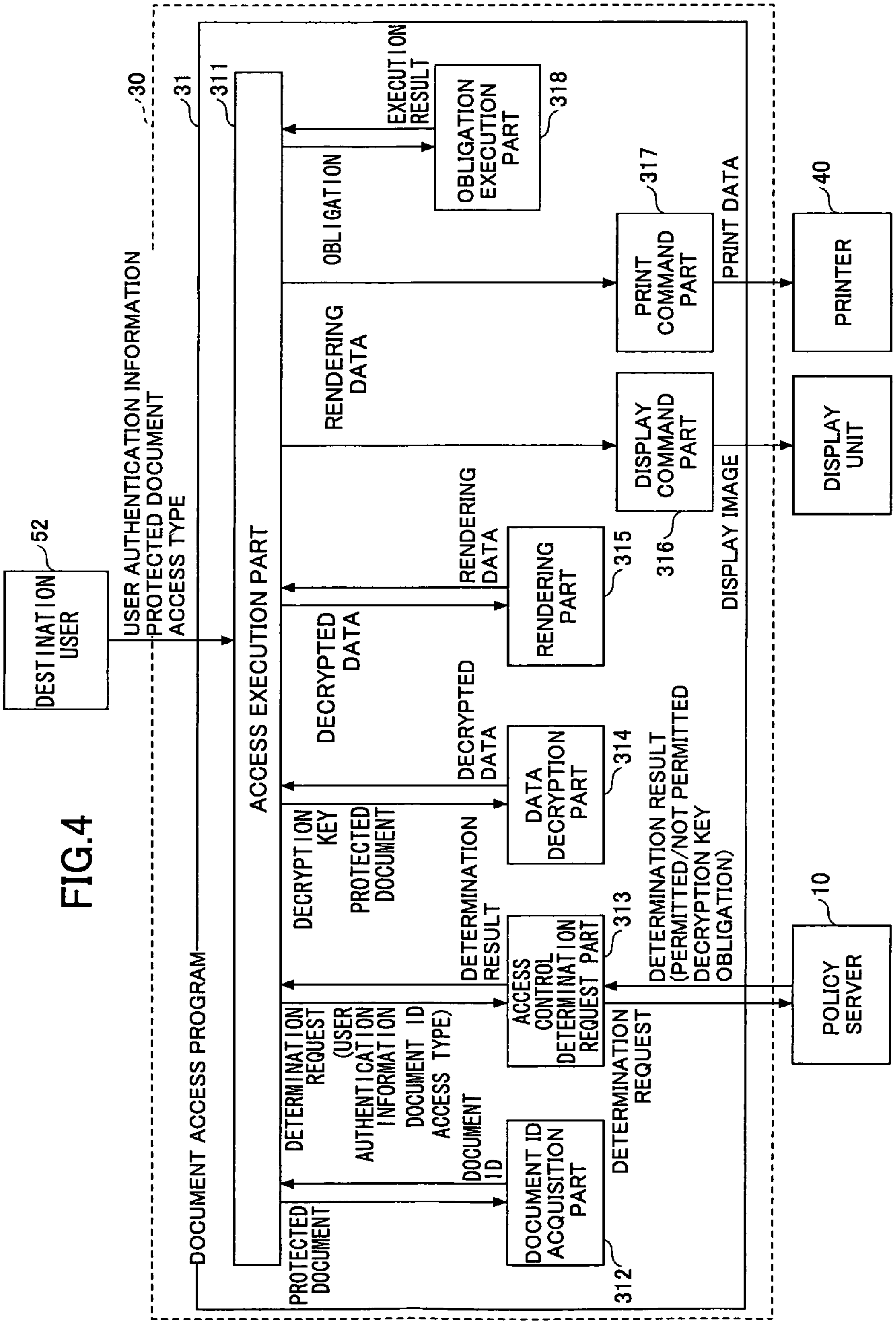
FIG. 4 is a functional diagram of a document access apparatus.

The details of the document access apparatus 30 are as follows. FIG. 4 is a functional diagram of the document access apparatus 30. With reference to FIG. 4, the document access program 31 is installed in the document access apparatus 30. The document access program 31 comprises an access execution part 311, a document ID acquisition part 312, an access control determination request part 313, a data decryption part 314, a rendering part 315, a display command part 316, a print command part 317, an obligation execution part 318, etc.

The access execution part 311 receives an access request containing the authentication information (user name, password, etc.), the protected document 61, and the access type (a character string indicating the requested access (operation) such as "open" indicating an operation of opening a document and "print" indicating an operation of printing a document). The access execution part 311 causes the document ID acquisition part 312 to acquire the document ID from the protected document 61, and outputs an access control determination request containing the document ID, the authentication information, and the access type to the access control determination request part 313. The access control determination request part 313 sends the determination request to the policy server 10, and receives a determination result containing an access permission determination result, a decryption key, an obligation, etc., from the policy server 10. The access control determination request part 313 outputs the received information to the access execution part 311.

If the determination result is "not permitted", the access execution part 311 reports to the destination user 52 that the access is not permitted, and thus the process ends. If, on the other hand, the determination result is "permitted", the access execution part 311 causes the obligation execution part 318 to execute the obligation contained in the determination result and receives an execution result. If the execution result is "failed" indicating failure to fulfill the obligation, the access execution part 311 reports an error to the destination user 52, and thus the process ends.

If the obligation is fulfilled, the access execution part 311 outputs the decryption key contained in the determination result received from the policy server 10 and the protected document 61 to the data decryption part 314 so as to receive decrypted data (i.e. the original document 60). The access execution part 311 outputs the decrypted data to the rendering part 315, receives rendering data, and then outputs the rendering data to the display command part 316 or the print command part 317 depending on the access type. The display command part 316 converts the rendering data into a display image, and causes a display unit to display the display image. The print command part 317 converts the rendering data into print data in a PDL or the like, and causes a printer 40 to print the print data.

In this way, the document access program 31 controls access to the protected document 61 based on the access control determination result by the policy server 10.

Figure 5:
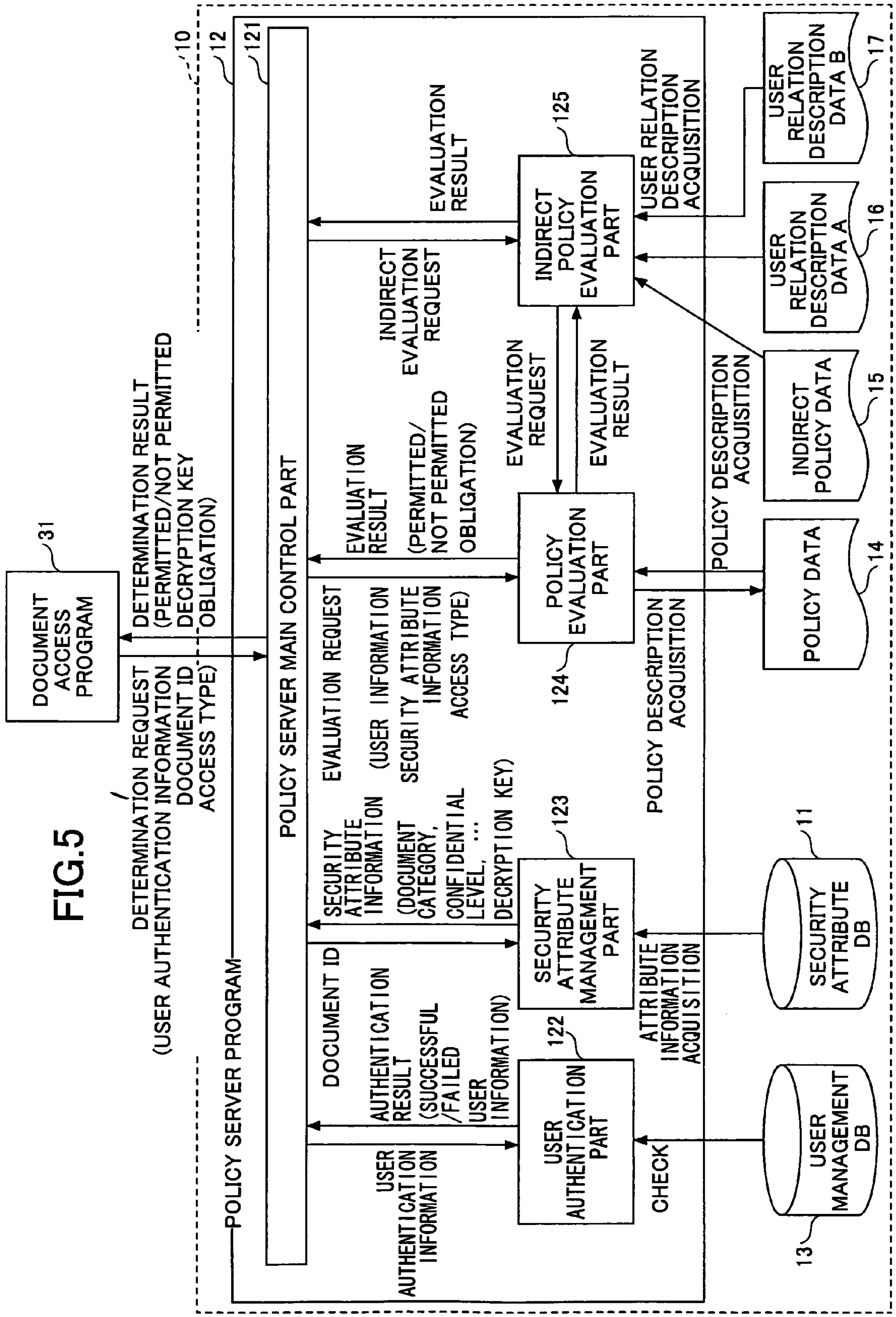
FIG. 5 is a functional diagram of a policy server according to a first embodiment.

The details of the policy server 10 are as follows. FIG. 5 is a functional diagram of the policy server 10 according to a first embodiment.

With reference to FIG. 5, the policy server 10 comprises, in addition to the above-described security attribute database 11, a policy server program 12, a user management database 13, policy data 14, indirect policy data 15, user relation description data A 16, user relation description data B 17, etc.

The policy server program 12 is adapted to cause the policy server 10 to determine document access control, and comprises a policy server main control part 121, a user authentication part 122, a security attribute management part 123, a policy evaluation part 124, an indirect policy evaluation part 125, etc.

The policy server main control part 121 receives an access control request (authentication information, document ID, access type) from the document access program 31. The policy server main control part 121 outputs the received authentication information to the user authentication part 122 for authenticating a user (the destination user 52), receives an authentication result, which indicates whether the authentication is successful, and receives user information if the authentication is successful. If the authentication fails, the policy server main control part 121 returns an error to the document access program 31, and thus the process ends.

If, on the other hand, the authentication is successful, the policy server main control part 121 outputs the document ID to the security attribute management part 123 so as to cause the security attribute management part 123 to acquire security attribute information (document category, confidential level, a list of related persons, domain, etc.) corresponding to the document ID from the security attribute database 11. The policy server main control part 121 outputs an access right evaluation request containing the user information, the security attribute information, and the access type to the policy evaluation part 124 so as to cause the policy evaluation part 124 to determine whether the access specified by the access type is permitted.

The policy evaluation part 124 determines whether the access is permitted by checking the user information, the security attribute information, and the access type against the policy data 14, and outputs an evaluation result containing an access permission determination result and an obligation. The policy data 14 used herein define access control information on a per user basis or on a per user category basis.

Figure 8:
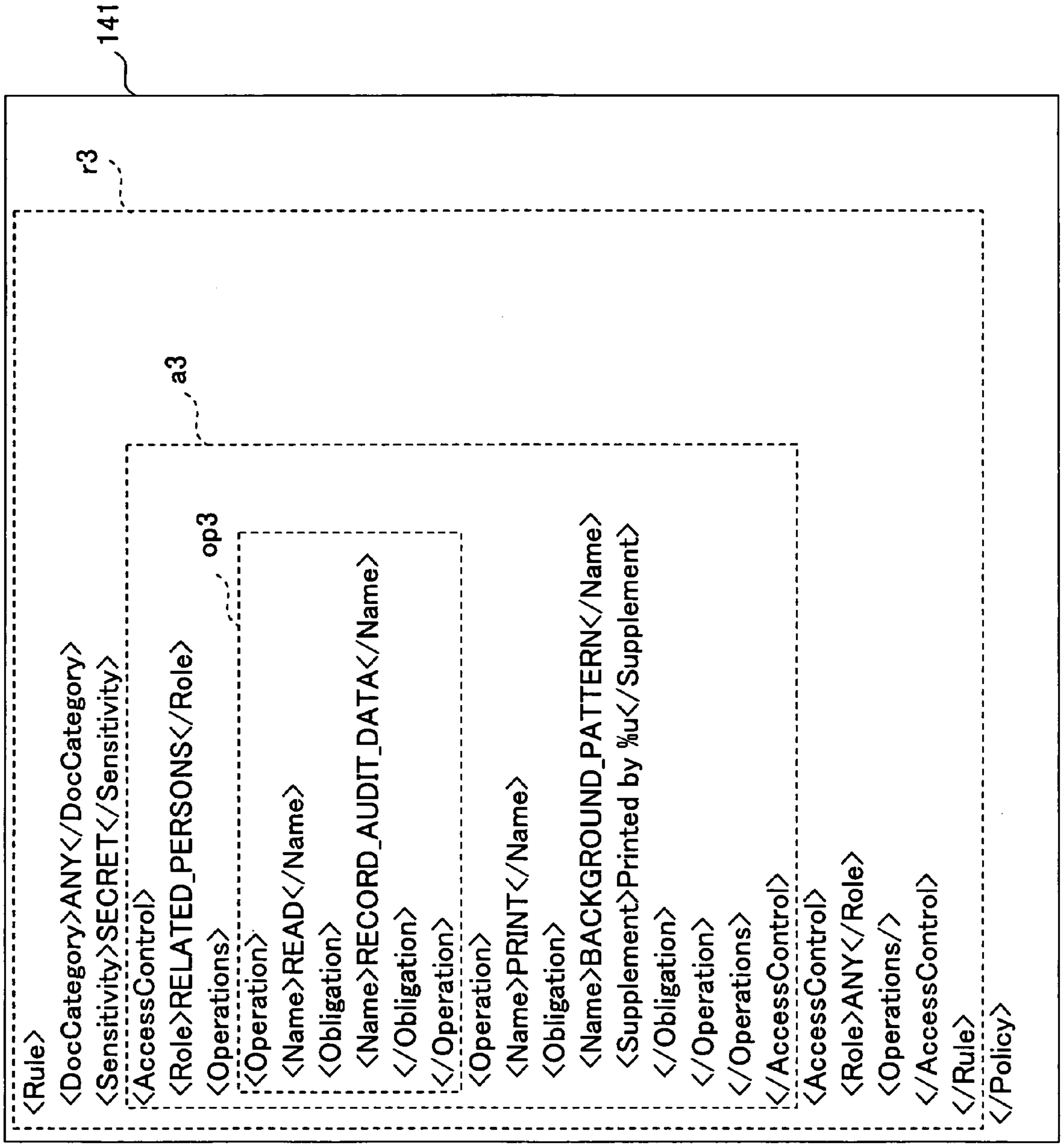

FIGS. 6-8 show an example of a policy description 141 in the policy data 14 according to the first embodiment. One policy description 141 in the policy data 14 is divided into three parts to be shown in FIGS. 6-8 for explanation purposes. The policy description 141 shown in FIGS. 6-8 is an example written in XML (extensible Markup Language) based on XACML (extensible Access Control Markup Language). However, the policy description 141 does not have to be written in XACML format or XML format.

With reference to FIGS. 6-8, one policy description 141 includes one Policy element (an element enclosed by <Policy> and </Policy> tags) as a route element. The Policy element defines access control information to access one domain, and includes one or more Rule elements as child elements. In FIGS. 6-8, the Policy element includes three Rule elements, i.e., Rule elements r1, r2, and r3.

Each Rule element includes a DocCategory element, a Sensitivity element, and one or more AccessControl elements as child elements, defining permitted access types (operations) and obligations according to combinations of the document categories and entities (i.e. users) that operate documents. For example, the Rule element r1 includes a DocCategory element d1, a Sensitivity element s1, and AccessControl elements all and a12.

The DocCategory element indicates, with its value (the value enclosed by <DocCategory> and </DocCategory> tags), the document category of documents to which the corresponding Rule element is applied. For example, the value of the DocCategory element d1 is "ANY", which indicates that documents to which the Rule element r1 is applied are in any document categories. On the other hand, the value of a DocCategory element d2 (FIG. 7) is "HUMAN_RESOURCE", which indicates that documents to which the Rule element r2 is applied are in a document category of "HUMAN_RESOURCE" (documents managed by a human resources department).

The Sensitivity element indicates, with its value, the confidential level of documents to which the corresponding Rule element is applied. For example, the value of the Sensitivity element s1 is "TOP_SECRET", which indicates that the documents to which the Rule element r1 is applied are documents whose confidential level is "TOP_SECRET".

Each AccessControl element includes a Role element and an Operations element as child elements, defining the category (role) of users who are permitted to access the documents to which the corresponding Rule element is applied and permitted access types.

The Role element indicates, with its value, the role of users to whom the corresponding AccessControl element is applied. For example, the value of a Role element r11 is "RELATED_PERSONS", which indicates that users to whom the AccessControl element all is applied are users whose role value is "RELATED_PERSONS". On the other hand, the value of a Role element r21 (FIG. 7) is "PRINCIPAL", which indicates that the users to whom the corresponding AccessControl element is applied are users whose role value is "PRINCIPAL".

The Operations element includes one or more Operation elements as child elements. Each Operation element includes a Name element and an Obligation element as child elements, defining a permitted access type and an obligation imposed for performing the access. The Name element indicates, with its value, the permitted access type. For example, the value of a Name element nil is "READ", which indicates that the permitted access type is "read". Similarly, "Print" indicates the permitted access type is "print".

The Obligation element includes a Name element and a Supplement element as child elements, defining an obligation. The Name element indicates an identifier of the obligation, while the Supplement element indicates supplementary information about the obligation. For example, the Obligation element ob11 includes a Name element with a value of "SHOW_DIALOG" and a Supplement element with a value of "Top secret document. Treat carefully.", indicating that an obligation to display a dialog with a message of "Top secret document. Treat carefully." is imposed.

It can be understood from the above description that the Rule element r1 defines a rule of "related persons are permitted to display top secret documents in any document categories, but a dialog with a message of "Top secret. Treat carefully" should be displayed". The Rule elements r2 and r3 can be interpreted in the same manner.

If the access is permitted, the policy server main control part 121 returns the evaluation result and the decryption key contained in the security attribute information to the document access program 31 as an access control determination result.

If, on the other hand, the access is not permitted, the policy server main control part 121 outputs an evaluation request containing the user information, the security attribute information, and the access type to the indirect policy evaluation part 125 so as to cause the indirect policy evaluation part 125 to determine whether an indirect access right is granted. The indirect access right is the one granted based on a particular relationship with another user. More specifically, the indirect access right is the one granted if a user whose access right is being evaluated has a particular relationship with another user.

The indirect policy evaluation part 125 determines whether the indirect access right is granted by checking the user information, the security attribute information, and the access type against the user relation description data A 16, the user relation description data B 17, the indirect policy data 15, etc. The indirect policy evaluation part 125 queries the policy evaluation part 124 for (i.e. sends an evaluation request to the policy evaluation part 124 for evaluation of) the access right of the user with whom the user being evaluated has the particular relationship, and determines the indirect access right based on an evaluation result by the policy evaluation part 124.

The user relation description data A 16 and the user relation description data B 17 define relationships between users. The user relation description data A 16 and the user relation description data B 17 define the user relationships from different points of view. In this embodiment, the user relation description data A 16 define a user relationship based on an organizational structure shown in FIG. 9.

Figure 9:
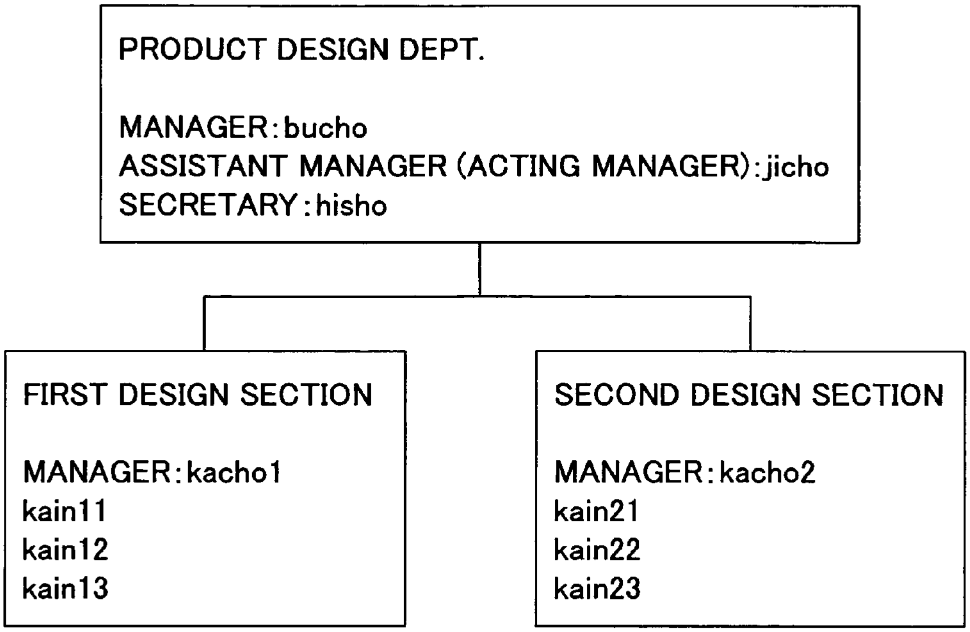
FIG. 9 shows an example of an organizational structure according to an embodiment of the present invention.

FIG. 9 shows an example of the organizational structure according to an embodiment of the present invention. The following information is presented in FIG. 9.

A first design section and a second design section belong to a product design department. The name of a manager of the product design department, an assistant manager (acting manager) of the product design department, and a secretary of the department manager are bucho, jicho, and hisho, respectively. Members of the first design section are kacho 1, the manager of the first design section, kain 11, kain 12, and kain 13. Members of the second design section are kacho 2, the manager of the second design section, kain 21, kain 22, and kain 23.

In FIG. 9, bucho, jicho, hisho, kacho 1, kain 11, kain 12, kain 13, kacho 2, kain 21, kain 22, and kain 23 are names (user names) of certain individuals.

On the other hand, the user relation description data B 17 define a spatial user relationship, more specifically, a user relationship based on a seating layout. In this embodiment, the user relation description data B 17 define user relationship based on a seating layout shown in FIG. 10.

Figure 10:
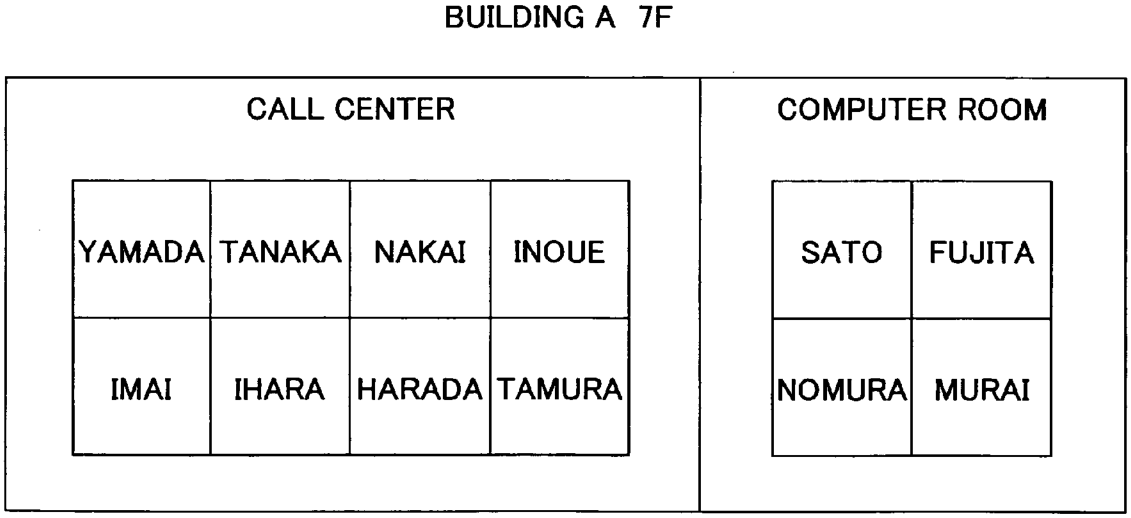
FIG. 10 shows an example of a seating layout according to an embodiment of the present invention.

FIG. 10 shows an example of the seating layout according to an embodiment of the present invention. In FIG. 10, a seating layout of the seventh floor of a building A is shown. As shown in FIG. 10, the seventh floor of the building A consists of two partitions (i.e. two areas divided by partitions) for a call center and a computer room. There are seats for Mr. Yamada, Mr. Tanaka, Mr. Nakai, Mr. Inoue, Mr. Imai, Mr. Ihara, Mr. Harada, and Mr. Tamura in the call center. There are seats for Mr. Sato, Mr. Fujita, Mr. Nomura, and Mr. Murai in the computer room.

The following describes an example of a user relation description 161 in the user relation description data A 16 based on the organizational structure shown in FIG. 9 and an example of a user relation description 171 in the user relation description data B 17 based on the seating layout shown in FIG. 10.

FIG. 11 shows the example of the user relation description 161 based on the organizational structure according to the first embodiment. FIG. 12 shows the example of the user relation description 171 based on the seating layout according to the first embodiment.

As shown in FIGS. 11 and 12, one user relation description includes one RelationDescription element as a route element. The RelationDescription element has a num attribute with a value for identifying the user relation description.

The RelationDescription element may include a Group element and an Element element as child elements.

The Group element indicates a group consisting of plural users and/or groups, and may include a Name element indicating the name of the group, and an Element element or a Group element indicating a user or a group belonging to the upper group.

The Element element indicates one user, and may include a Name element indicating the user name of the user and one or more Role elements as child elements. The Role element indicates a relationship of the user indicated by the corresponding Element element with another user, and includes a Type element and a Target element as child elements.

The Type element indicates the type of the relationship with another user or a group, and has a character string representing the relationship as its value. The Target element indicates another user or a group, and has a user name of another user or a group name of a group as its value. If the value of the Target element is a group name, the relationship indicated by the Type element is established with all the users belonging to the group indicated by the Target element.

For example, in the user relation description 161 of FIG. 11, a Name element n1 indicates that a Group element g1 describes the product design department. The Group element g1 includes Element elements ell, e12, and e13, and Group elements g11 and g12 as child elements. This indicates that bucho, jicho, hisho, the first design section, and the second design section belong to the product design department.

A Role element r11 in the Element element ell includes a Type element with a value of "MANAGER" and a Target element with a value of "PRODUCT_DESIGN_DEPT". This indicates that a user (bucho) corresponding to the Element element ell has a relationship (role) as MANAGER with respect to all the users belonging to the product design department.

A Role element r13 in the Element element e13 includes a Type element with a value of "SECRETARY" and a Target element with a value of "bucho". This indicates that a user (hisho) corresponding to the Element element e13 has a relationship (role) as SECRETARY with respect to bucho.

The user relation description 171 of FIG. 12 can be interpreted in the same manner. For example, in the user relation description 171 of FIG. 12, a Name element n1 indicates that a Group element g1 describes the building A. The Group element g1 includes plural Group elements corresponding to floors of the building A as child elements.

For example, a Name element n11 indicates that a Group element g11 describes the first floor. Also, a Name element n12 indicates that a Group element g12 describes the seventh floor. It is to be noted that Group elements corresponding to other floors are not shown for purposes of simplicity of illustration.

The Group element g12 corresponding to the seventh floor includes a Group element g121 and a Group element g122 as child elements. A Name element n121 indicates that the Group element g121 describes the call center. A Name element n122 indicates that the Group element g122 describes the computer room.

The Group element g121 includes Element elements for the users who have seats in the call center as child elements. For example, an Element element e1211 is for Mr. Yamada, and includes three Role elements r12111-r12113. This indicates that Mr. Yamada has three relationships (roles).

More specifically, the Role element r12111 defines that Mr. Yamada has a role of "SAME_PARTITION" with respect to all the users belonging to the call center. The Role element r12112 defines that Mr. Yamada has a role of "SAME_FLOOR" with respect to all the users belonging to the seventh floor. The Role element r12113 defines that Mr. Yamada has a role of "SAME_BUILDING" with respect to all the users belonging to the building A.

As is clear from FIGS. 11 and 12, the description format of the user relation descriptions 161 and 171 in this embodiment is designed for general purposes, and therefore different types of relationships can be described in the same format (using tags, etc.). Accordingly, the description format used in this embodiment can be applied to describe not only organizational structures and seating layouts but also other relationships.

Referring back to FIG. 5, the indirect policy data 15 define access control information for determining indirect access rights, i.e., access control information based on the user relationships defined in the user relation descriptions 161 and 171 of FIGS. 11 and 12.

FIG. 13 shows an example of an indirect policy description 151 in the indirect policy data 15 according to the first embodiment. The description format of the indirect policy description 151 is basically the same as the policy description 141 described with reference to FIGS. 6-8. More specifically, a Policy element as a route element includes one or more Rule elements as its child elements. Each Rule element includes a DocCategory element, a Sensitivity element, and one or more AccessControl elements, defining permitted access types according to combinations of the document category, the confidential level, and the role.

However, the meaning of the Role element in the indirect policy description 151 is different from that of the Role element in the policy description 141. More specifically, the value of the Role element in the policy description 141, which may be RELATED_PERSONS or PRINCIPAL, indicates the role that is assigned in the relationship with the document. On the other hand, the value of the Role element in the indirect policy description 151, which may be MANAGER, ACTING_MANAGER, or SECRETARY, indicates the role that is assigned in the relationship with another user. That is, the indirect policy data 15 define access rights to documents based on a user relationship.

The Access Control element in the indirect policy description 151 may include a SameAsTheRoleTarget element as a child element, in addition to a Role element and an Operations element. The SameAsTheRoleTarget element is described with reference to specific examples.

For example, the indirect policy description 151 shown in FIG. 13 includes Rule elements r1, r2, r3, etc., as child elements of a Policy element. The documents to which the Rule element r1 are applied are those in the document category of "HUMAN_RESOURCE" and at the confidential level of "SECRET" as specified by a DocCategory element d1 and a Sensitivity element s1. Also, users to whom the Rule element r1 is applied are those with a role of "Manager" as specified by a role element r1. The Rule element r1 includes a SameAsTheRoleTarget element t1 in the position corresponding to the position of the Operations element in the policy description 141. The SameAsTheRoleTarget element indicates that the same access right as those granted to a "role target user" is granted. The "role target user" as used herein indicates a user with whom the user has a role, a position, or a relationship indicated by the role element. For example, if the role is MANAGER, the "role target users" are users with whom the user has the role of a department manager or a section manager, i.e., users belonging to the department or the section.

More objectively, the "role target users" are uses who are specified by the value of the Target elements in the Role elements in the user relation descriptions 161 and 171 (FIGS. 11 and 12)

For example, referring to FIG. 11, the Element element ell defines that bucho has a role of MANAGER with respect to the product design department. Accordingly, all the users belonging to the product design department are role target users of bucho as MANAGER. Similarly, all the users belonging to the first design section are role target users of kacho 1 as MANAGER.

That is, the role target user varies depending not only on the identification name of the role (MANAGER, SECRETARY, etc.) but also on the user (bucho or kacho 1) who has the role.

It is to be noted that, in the indirect policy description 151, the access rights different from those granted to a role target user may be granted by defining an Operations element in place of the SameAsTheRoleTarget element. For example, an AccessControl element a32 defines the access right not by a SameAsTheRoleTarget element but by an Operations element. In this case, the access right is evaluated based on an Operation element included in the Operations element.

Referring back to FIG. 5, as in the case where the policy evaluation part 124 evaluates that the access is permitted, if the indirect policy evaluation part 125 determines that the access is permitted, the policy server main control part 121 returns the evaluation result and the decryption key contained in the security attribute information to the document access program 31 as an access control determination result.

If, on the other hand, the indirect policy evaluation part 125 determines that the access is not permitted, the policy server main control part 121 returns an access control determination result indicating that the access is not permitted to the document access program 31.

In this way, in the policy server program 12, even if the policy evaluation part 124 determines that a direct access is not permitted, the access is permitted if the indirect policy evaluation part 125 determines that an indirect access is permitted.

The policy data 14, the indirect policy data 15, the user relation description data A 16, and the user relation description data B 17 are stored in advance in the policy server program 12. Since security policies might differ from department to department, it is preferable to allow storing plural sets of policy data 14 and plural sets of indirect policy data 15 in the policy server program 12. In the case where plural sets of policy data 14 and indirect policy data 15 are stored, the plural sets of policy data 14 and indirect policy data 15 may preferably be associated with domain names indicating corresponding departments for management purposes.

Figure 14:
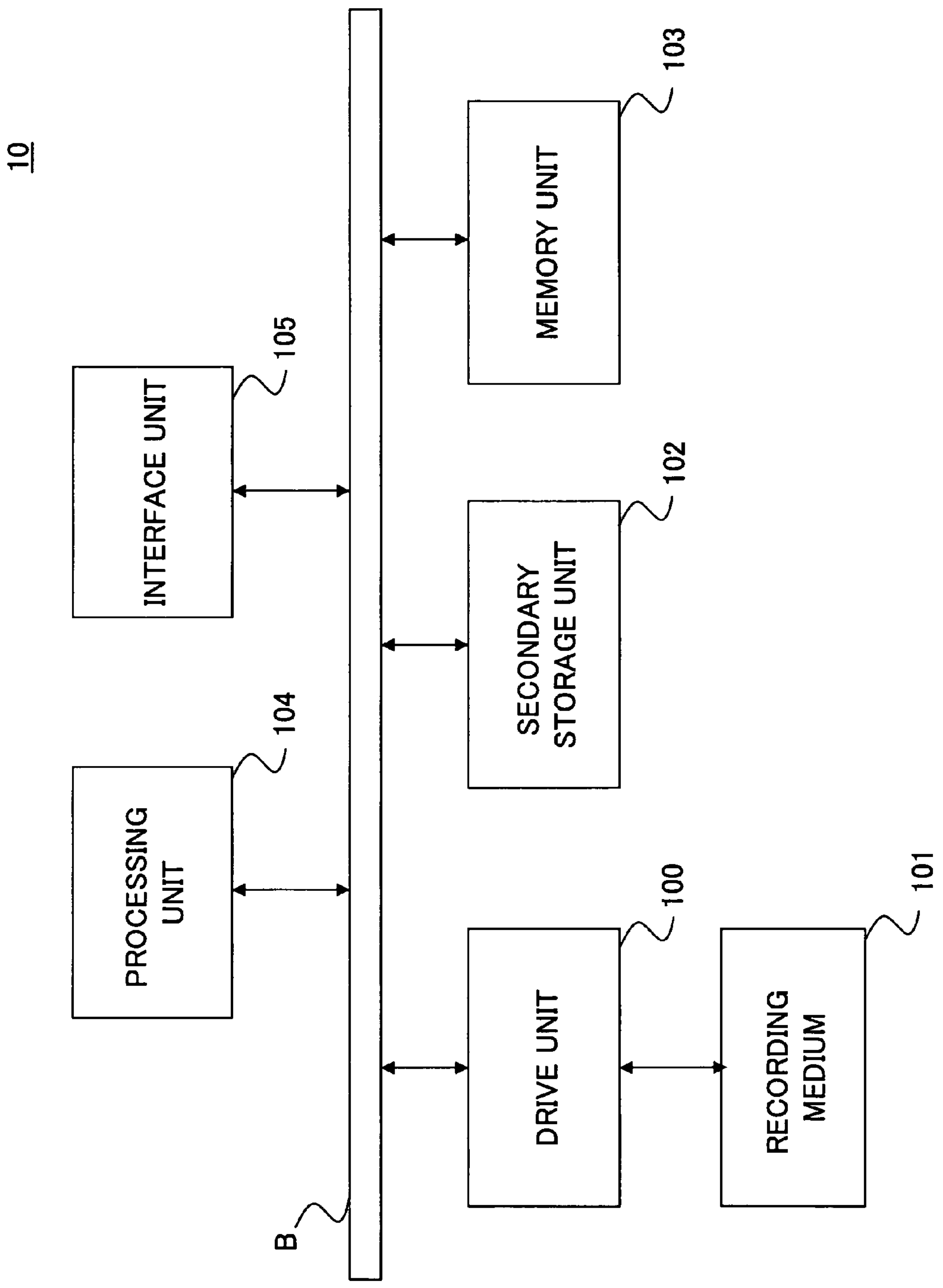
FIG. 14 is a block diagram showing a hardware configuration of a policy server according to an embodiment of the present invention.

FIG. 14 is a block diagram showing a hardware configuration of the policy server 10 according to an embodiment of the present invention. The policy server 10 of FIG. 14 comprises a drive unit 100, a secondary storage unit 102, a memory unit 103, a processing unit 104, and an interface unit 105, which are connected to each other via a bus B.

A recording medium 101 such as a CD-ROM provides the policy server program 12 for executing operations in the policy server 10. When the recording medium 101 with the policy server program 12 recorded thereon is loaded into the drive unit 100, the policy server program 12 is loaded into the secondary storage unit 102 from the recording medium 101 via the drive unit 100.

The secondary storage unit 102 stores the installed policy server program 12 as well as necessary files and data therein. The memory unit 103, in response to a command for starting the policy server program 12, reads out the policy server program 12 from the secondary storage unit 102 and holds the policy server program 12 therein. The processing unit 104 operates the policy server 10 according to the policy server program 12 held in the memory unit 103. The interface unit 105 is used for connection to a network.

The following describes in greater detail the operations by each part of the policy server program 12 that are roughly described with reference to FIG. 5.

Figure 15:
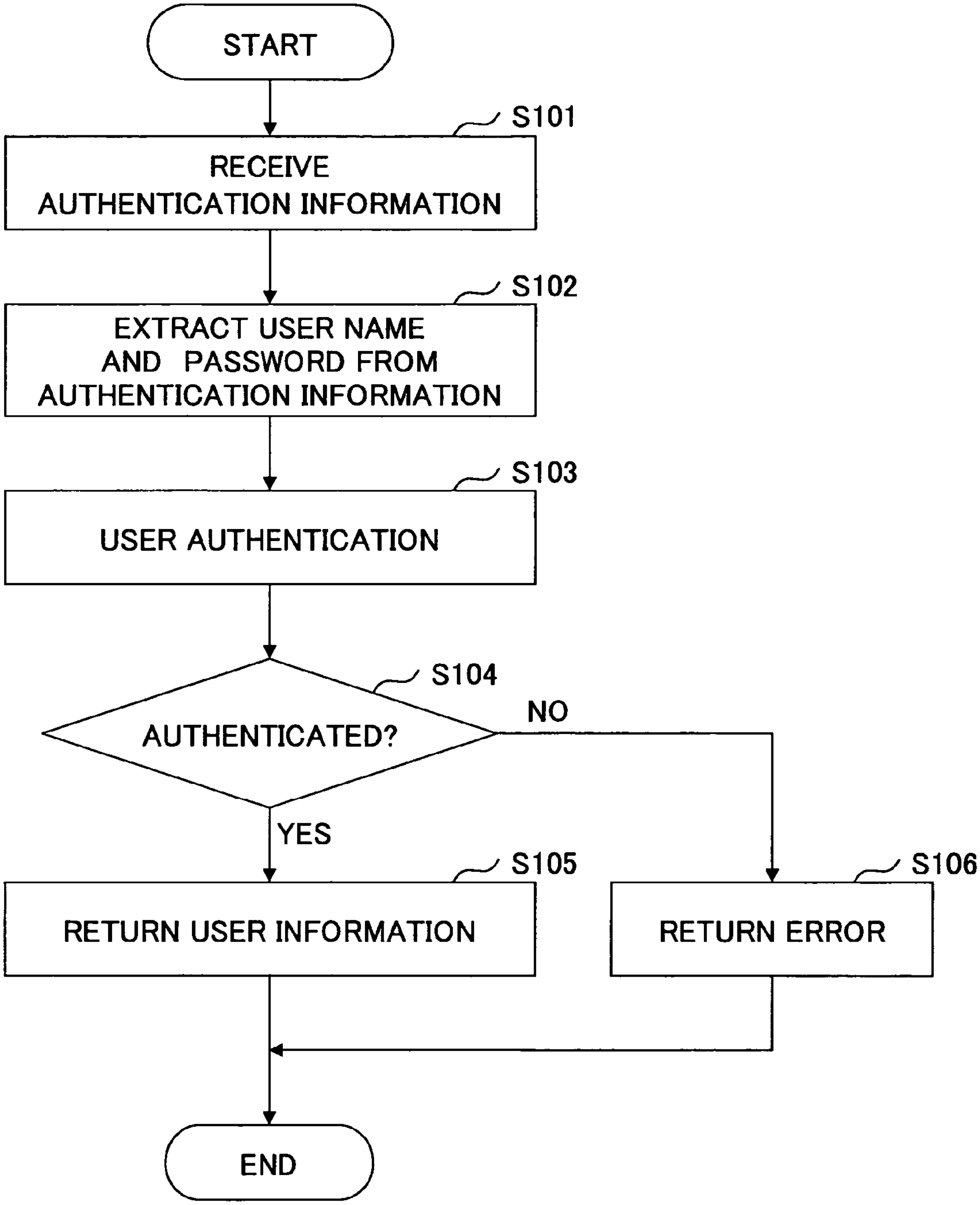
FIG. 15 is a flowchart illustrating user authentication by a user authentication part.

FIG. 15 is a flowchart illustrating user authentication by the user authentication part 122. The user authentication part 122 performs the following operations in response to a user authentication request from the policy server main control part 121.

When authentication information is received from the policy server main control part 121 (S101), a user name and a password are extracted from the authentication information (S102). Then, user authentication is performed by checking the extracted user name and password against the user management information (combinations of user names and passwords) registered in the user management database 13 (S103).

If the user is authenticated (Yes in S104), user information (e.g. information containing a user name, a group name, etc.) is returned to the policy server main control part 121 (S105). If, on the other hand, the user is not authenticated (No in S104), information indicating failure of the user authentication, i.e., an error, is returned to the policy server main control part 121 (S106).

Figure 16:
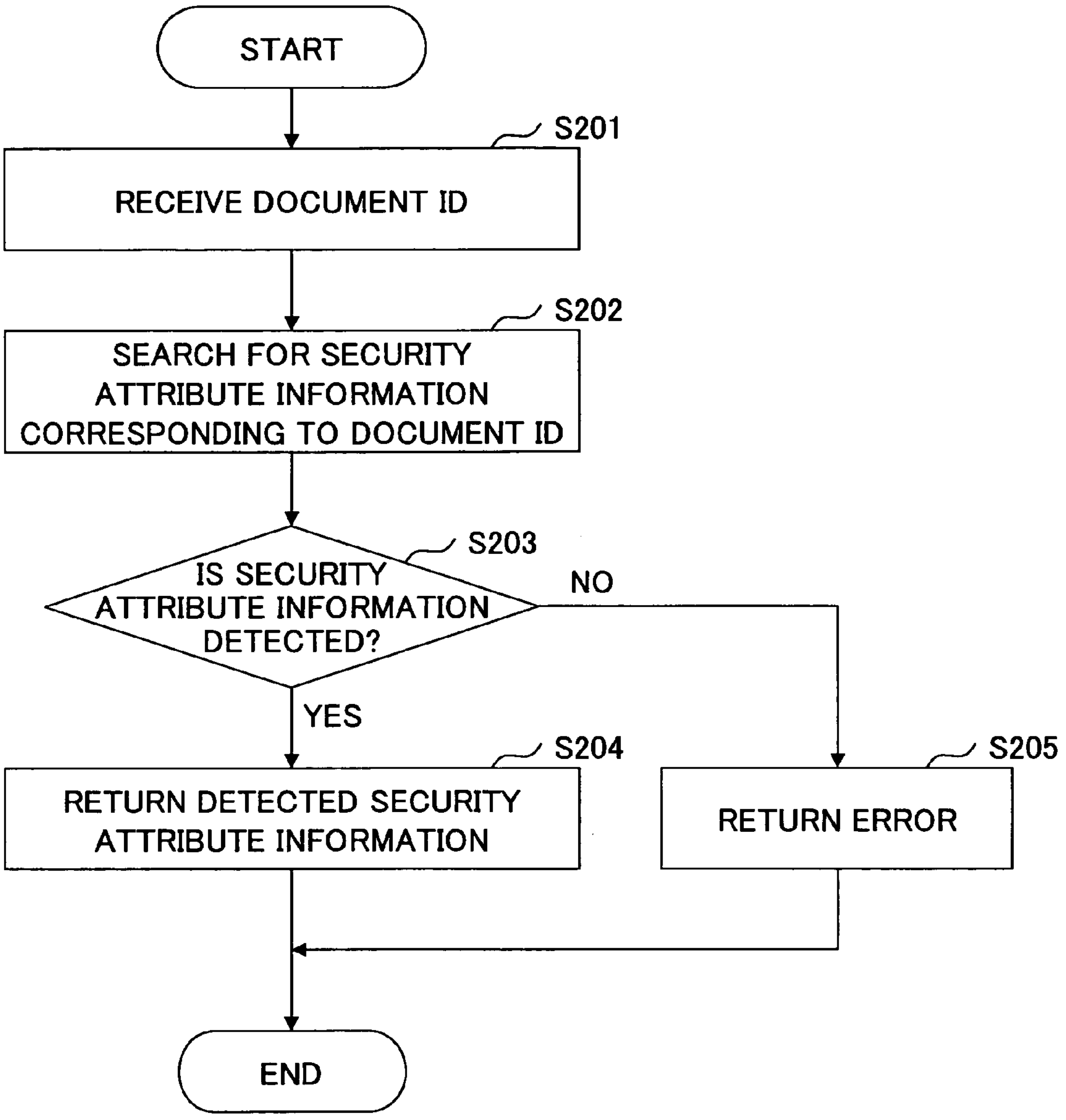
FIG. 16 is a flowchart illustrating security attribute information search by a security attribute management part.

The following describes operations to be performed by the security attribute management part 123 when the user is authenticated. FIG. 16 is a flowchart illustrating security attribute information search by the security attribute management part 123.

When a document ID is received from the policy server main control part 121 (S201), the security attribute database 11 is searched for security attribute information corresponding to the document ID (S202).

If the corresponding security attribute information is detected (Yes in S203), the detected security attribute information (domain, document category, confidential level, decryption key, etc.) is returned to the policy server main control part 121. If, on the other hand, the corresponding security attribute information is not detected (No in S203), information indicating failure of search, i.e., an error is returned to the policy server main control part 121 (S205).

Figure 17:
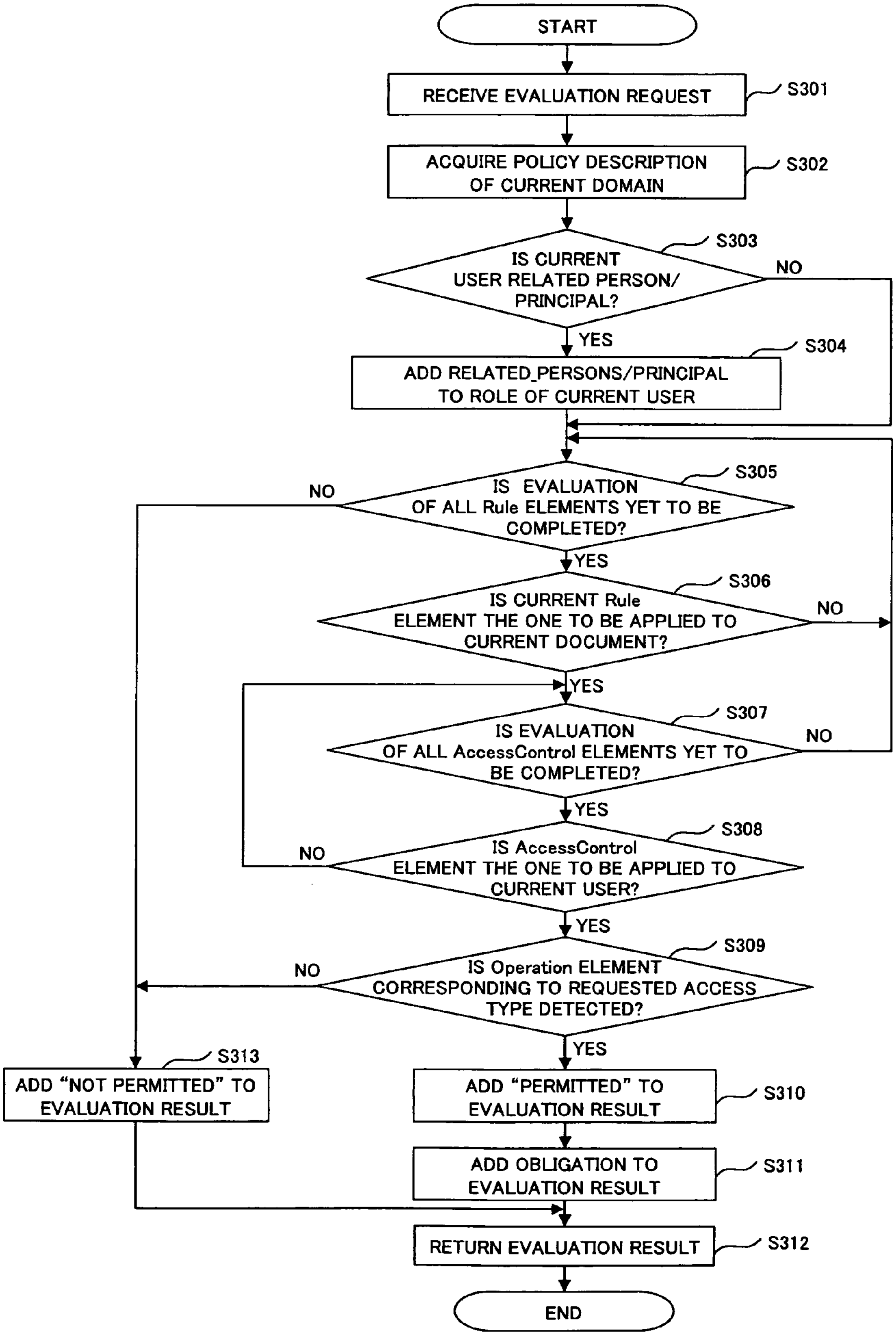
FIG. 17 is a flowchart illustrating access right evaluation by a policy evaluation part according to the first embodiment.

The following describes operations to be performed by the policy evaluation part 124 when the search for security attribute information is successful. FIG. 17 is a flowchart illustrating access right evaluation by the policy evaluation part 124 according to the first embodiment.

When an evaluation request containing user information, security attribute information, and the access type is received from the policy server main control part (S301), the policy data 14 corresponding to the domain contained in the security attribute information are acquired so as to read the policy description 141 in the policy data 14 (see FIGS. 6-8) (S302).

After the policy description 141 is read, it is determined whether a user attempting to access (hereinafter referred to as a "current user") is a related person or a principal of a document being accessed (hereinafter referred to as a "current document") (S303). If the user name contained in the user information is contained as a related person/principal in the security attribute information, the current user is determined to be a related person/principal.

If the current user is determined to be a related person/principal, "RELATED_PERSONS" and "PRINCIPAL" are added to the role of the current user.

In Step S305 and the steps that follow, a loop process for sequentially processing the Rule elements in the policy description 141 is performed. The Rule element being processed in the loop process is hereinafter referred to as a "current Rule element".

It is determined whether the current Rule element is the rule to be applied to the current document (S306). If the value of a DocCategory element and the value of a Sensitivity element in the current Rule element correspond to the document category and the confidential level, respectively, contained in security attribute information, the current Rule element is determined to be the rule to be applied to the current document. If otherwise (No in S306), the current Rule element is not determined to be the rule to be applied to the current document. Thus, the next Rule element is processed as a current Rule element.

If the current Rule element is the rule to be applied to the current document (Yes in S306), an AccessControl element to be applied to the current user is searched for among AccessControl elements in the current Rule element (S307, S308). The AccessControl element to be applied to the current user is the one whose Role element has the value corresponding to the role of the current user. If none of the AccessControl elements is the one to be applied to the current user (No in S307), the next Rule element is processed.

If the AccessControl element to be applied to the current user is detected (Yes in S308), an Operation element corresponding to the requested access type is searched for in an Operations element in the AccessControl element (S309)

If the Operation element corresponding to the requested access type is detected (Yes in S309), "Permitted" is added to an evaluation result (S310). Then the obligation defined in an Obligation element in the Operation element is added to the evaluation result (S311). The evaluation result is returned to the policy server main control part 121 (S312), and thus the process ends.

If, on the other hand, the Operation element corresponding to the requested access type is not detected (No in S309), "Not permitted" is added to an evaluation result (S313). Then the evaluation result is returned to the policy server main control part 121 (S312).

Figure 18:
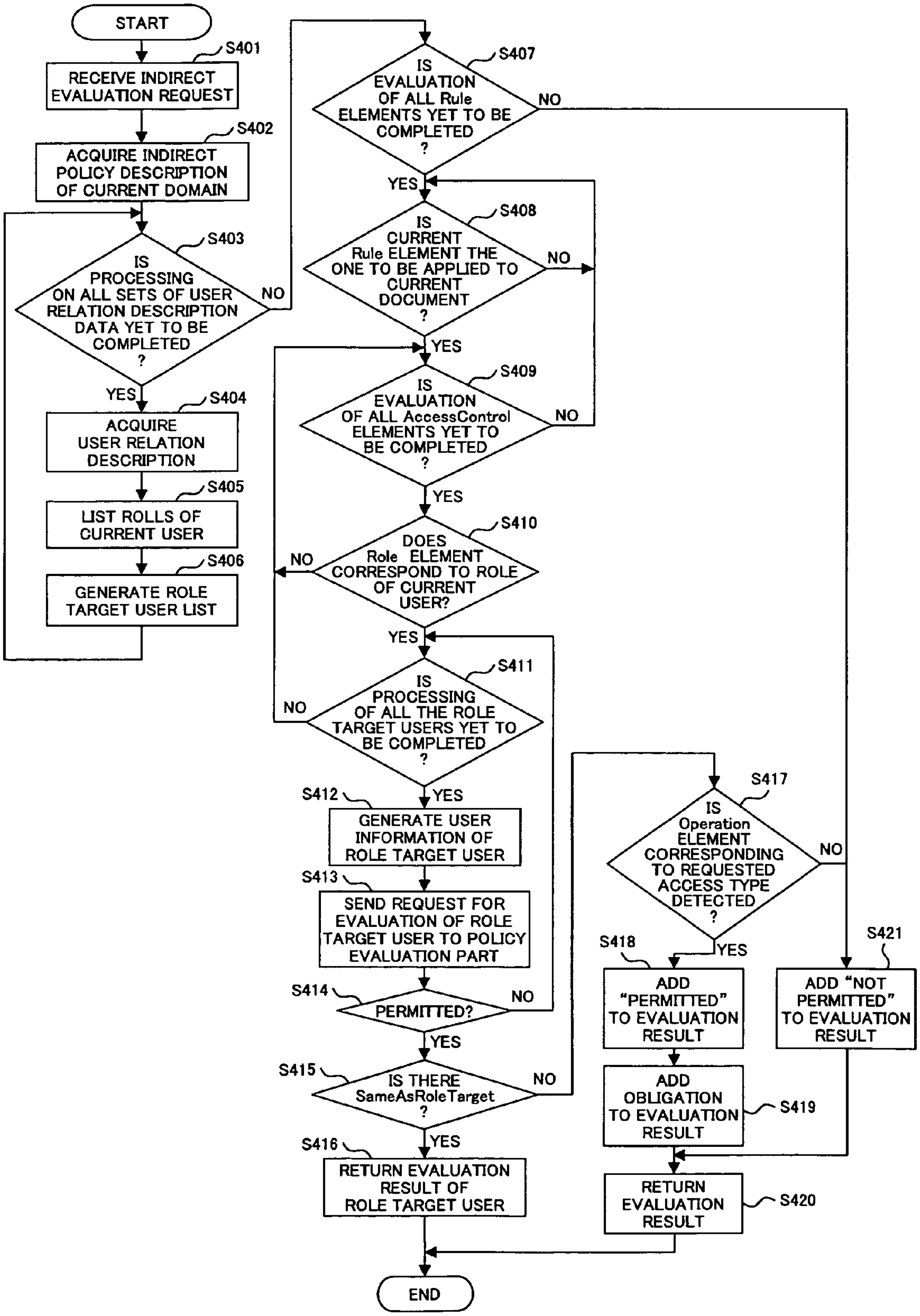
FIG. 18 is a flowchart illustrating indirect access right evaluation by an indirect policy evaluation part according to the first embodiment.

The following describes operations to be performed by the indirect policy evaluation part 125 when the evaluation result by the policy evaluation part 124 is "Not permitted". FIG. 18 is a flowchart illustrating indirect access right evaluation by the indirect policy evaluation part 125 according to the first embodiment.

When an indirect policy evaluation request containing user information, security attribute information, and the access type is received from the policy server main control part 121 (S401), the indirect policy data 15 corresponding to the domain contained in the security attribute information are acquired so as to read the indirect policy description 151 in the indirect policy data 15 (see FIG. 13) (S402).

Then, operations in Step S404 through Step S406 are performed on each set of user relation description data. More specifically, the user relation description 161 or the user relation description 171 is read from the user relation description data A 16 or the user relation description data B 17 (S404), and roles of a user attempting to access (hereinafter referred to as a "current user") are listed (S405). More specifically, the values of Type elements in all the Role elements in an Element element corresponding to the current user are listed. The current user is identified by the user name contained in the user information.

The user names of role target users of the listed roles, i.e., the value of Target elements in the Role elements are listed (S406). The list of these user names is hereinafter referred to as a "role target user list". If the value of the Target element is a group name, user names belonging to the group are recursively retrieved and added to the role target user list.

If generation of a role target user list for each set of the user relation description data is completed (No in S403), a loop process for sequentially processing the Rule elements in the indirect policy description 151 is performed (S407). The Rule element being processed in the loop process is hereinafter referred to as a "current Rule element".

It is determined whether the current Rule element is the rule to be applied to a document being accessed (hereinafter referred to as a "current document") (S408). If the value of a DocCategory element and the value of a Sensitivity element in the current Rule element correspond to the document category and the confidential level, respectively, contained in security attribute information, the current Rule element is determined to be the rule to be applied to the current document. If otherwise (No in S408), the current Rule element is not determined to be the rule to be applied to the current document. Thus, the next Rule element is processed as a current Rule element.

If the current Rule element is the rule to be applied to the current document (Yes in S408), an AccessControl element to be applied to the current user is searched for among AccessControl elements in the current Rule element (S409, S410). The AccessControl element to be applied to the current user is the one whose Role element has the value corresponding to the role of the current user (any of the roles listed in S405). If none of the AccessControl elements is the one to be applied to the current user (No in S409), the next Rule element is processed.

If the AccessControl element to be applied to the current user is detected (Yes in S410), user information is generated for each of role target users on the role target user list corresponding to a role (hereinafter referred to as a "current role") indicated by a Role element in the detected AccessControl element (hereinafter referred to as a "current AccessControl element") (S412). Then a request for access right evaluation is sent to the policy evaluation part 124 (S413).

It is to be noted that, in Step S413, the security attribute information, the access type, and the user information of the role target users are output to the policy evaluation part 124. Upon reception of the request, the policy evaluation part 124 performs the operations described with reference to FIG. 17, i.e., evaluation of access right based on the policy data 14 for each of the role target users as users attempting to access the document, and outputs evaluation result to the indirect policy evaluation part 125.

If the policy evaluation part 124 determines that none of the role target users is permitted to access the document (No in S411), operations in Step S409 and the steps that follow are performed on the next AccessControl element in the current Rule element.

If the policy evaluation part 124 determines that one or more of the role target users are permitted to access the document (Yes in S414), it is determined whether there is a SameAsTheRoleTarget element in the current AccessControl element (S415). If there is a SameAsTheRoleTarget element (Yes in S415), the evaluation result by the policy evaluation part 124 is returned to the policy server main control part 121 as the evaluation result by the indirect policy evaluation part 125 (S416). That is, in this case, the access right that is not directly granted to the current user is granted to the current user based on the right that the role target users of the current user have.

If, on the other hand, there is not a SameAsTheRoleTarget element in the current AccessControl element (No in S415), an Operation element corresponding to the requested access type is searched for in an Operations element in the AccessControl element (S417).

If the Operation element corresponding to the requested access type is detected (Yes in S417), "Permitted" is added to an evaluation result (S418). Then the obligation defined in an Obligation element in the Operation element is added to the evaluation result (S419). The evaluation result is returned to the policy server main control part 121 (S420), and thus the process ends.

If, on the other hand, the Operation element corresponding to the requested access type is not detected (No in S417), "Not permitted" is added to an evaluation result (S421). Then the evaluation result is returned to the policy server main control part 121 (S420).

It is to be noted that, in the operations shown in FIG. 18, an access right not granted to the role target users is not granted to the current user. In other words, if there is not a SameAsTheRoleTarget element (i.e. if the access right is defined by an Operation element) it is determined whether the access right is granted to the role target user. If the access right is granted to the role target user, the Operation element can be used in the evaluation.

However, the present invention is not limited to this method. For example, if an access right is defined by an Operation element, the operation of checking whether the access right is granted to the role target user may not be performed. In this case, if the role target user is contained as a related person/principal in the security information, access right evaluation may be performed based on an Operation element thereof.

The following is a specific example of the operations shown in FIGS. 17 and 18, in which a user, kain 12, attempts to read a document having a security attribute of FIG. 3, i.e., a document with the document ID of SEC00123. As shown in FIG. 3, kain 12 is contained as a related person/principal in the security attribute of the document SEC000123. Accordingly, the role of kain 12 is RELATED_PERSONS or PRINCIPAL (S304 in FIG. 17). The document SEC000123 is a secret (SECRET) document managed by a finance department (FINANCE). Accordingly, the Rule element r3 (FIG. 8) in the policy description 141 in the policy data 14, including a DocCategory element of ANY and a Sensitivity element of SECRET, is applied.

More specifically, an AccessControl element a3 of the Rule element r3 including a Role element with a value of RELATED_PERSONS is applied. As the AccessControl element a3 includes an Operation element op3 corresponding to READ, reading is permitted. However, an obligation of recording a log (RECORD_AUDIT_DATA) is imposed.

The following is another specific example, in which kacho 1 attempts to read the same document (SEC000123). As shown in FIG. 3, kacho 1 is not contained as a related person/principal in the security attribute of the document SEC000123. Accordingly, an evaluation result by the policy evaluation part 124 is "Not permitted".

Then, a request for evaluation of kacho 1 is sent to the indirect policy evaluation part 125 (S401). As shown in the user relation description 161 (FIG. 11) in the user relation description data A 16, an Element element e111 corresponding to kacho 1 includes a Role element including a Type element with a value of "MANAGER" and a Target element with a value of "FIRST_DESIGN_SECTION". That is, kacho 1 has a role of MANAGER with respect to role target users, i.e., users (kain 11, kain 12, kain 13) belonging to the first design section.

The SEC000123 is a secret (SECRET) document managed by the finance department (FINANCE). Accordingly, the Rule element r3 (FIG. 13) in the indirect policy description 151 in the indirect policy data 15, including a DocCategory element of ANY and a Sensitivity element of SECRET, is applied.

More specifically, an AccessControl element a31 of the Rule element r3 including a Role element with a value of MANAGER is applied. As the AccessControl element a31 includes a SameAsTheRoleTarget element, a query for an access right of kain 12, who is one of the role target users of kacho 1, is sent to the policy evaluation part 124.

Evaluation of kain 12 is as described above. That is, reading is permitted while an obligation of recording a log (RECORD_AUDIT_DATA) is imposed. This evaluation is applied as the evaluation of kacho 1 by the indirect policy evaluation part 125.

In this way, the policy server 10 of the first embodiment can control access to documents based on relationships between users. Therefore, it is possible to easily realize flexible access control based on, e.g., personal relationships, such as a boss and his/her subordinate, a person and his/her secretary, and a person and his/her deputy, in organizations such as companies, and based on personal relationships such as whether persons belong to the same spatial segment. Accordingly, a source user who delivers a document does not have to think about persons to whom a destination user needs to present the delivered document.

In the indirect policy description 151 in the first embodiment, granting the same right as a role target user can be easily defined by a. SameAsTheRoleTarget element. That is, the description format of the indirect policy description 151 allows a practical policy description while maintaining security, and therefore is very convenient.

The document access control system 1 in the first embodiment controls access to encrypted protected documents using the policy server 10 that provides the above-described advantages. That is, the document access control system 1 determines whether access to a protected document is permitted based on a policy that defines the access right and based on a user relation description that defines a user relationship at the same time. Further, the document access control system 1 decides whether to provide a decryption key for the protected document based on the determination result of the access right. Accordingly, even if a direct access to a protected document is not permitted in the policy, the access to the protected document can be controlled based on the user relation description. Therefore, flexible access control in distribution of confidential documents is realized.

The description format of the user relation description in the first embodiment is designed for general purposes. Therefore, the description format can be used for describing not only the user relationship based on the organizational structure and the seating layout exemplified in the first embodiment, but also various user relationships such as user relationship based on network segments, etc., can be described. Accordingly, access control based on various user relationships can be easily realized.

In related art, there is an access control technology based on groups of plural users. The mechanism employed in this technology is that when a read right is granted to a group, the read right is granted to all the users who belong to the group. The following is an example of realizing the same function as the access control in the first embodiment using this mechanism. In order to give a read right to a boss of kain 11, who is a member of the first design section by granting a read right to kain 11, a group of kain11_boss as a group indicating bosses of kain 11 needs to be created so as to give the read right to the kain11_boss group. That is, such a group needs to be created for each of the users to whom access rights are given based on the relationship with kain 11. This method is not intuitive and very inefficient.

RBAC (Role Based Access Control) is known as related art for access control based on roles. In RBAC, plural roles can be assigned to a user. If a read right for a certain role is added to a document, users assigned to that role are permitted to read the document. For example, if b_joushi_1 is assigned to a role of a manager and a read right for managers is added to a document to be distributed, b_joushi_1 can read the document distributed to b_tantou_1. However, the role used herein does not have information "boss of whom". That is, any user assigned to a manager can read the distributed document even if the user is not the boss of b_tantou_1 who received the distributed document. On the other hand, the policy server 10 of the first embodiment can give the same right as b_tantou_1 only to b_joushi_1 who is the boss of b_tantou_1. It is difficult to immediately realize such a function with the mechanism of RBAC. See http://csrc.nist.gov/rbac/rbacSTD-ACM.pdf for more details about RBAC.

Figure 19:
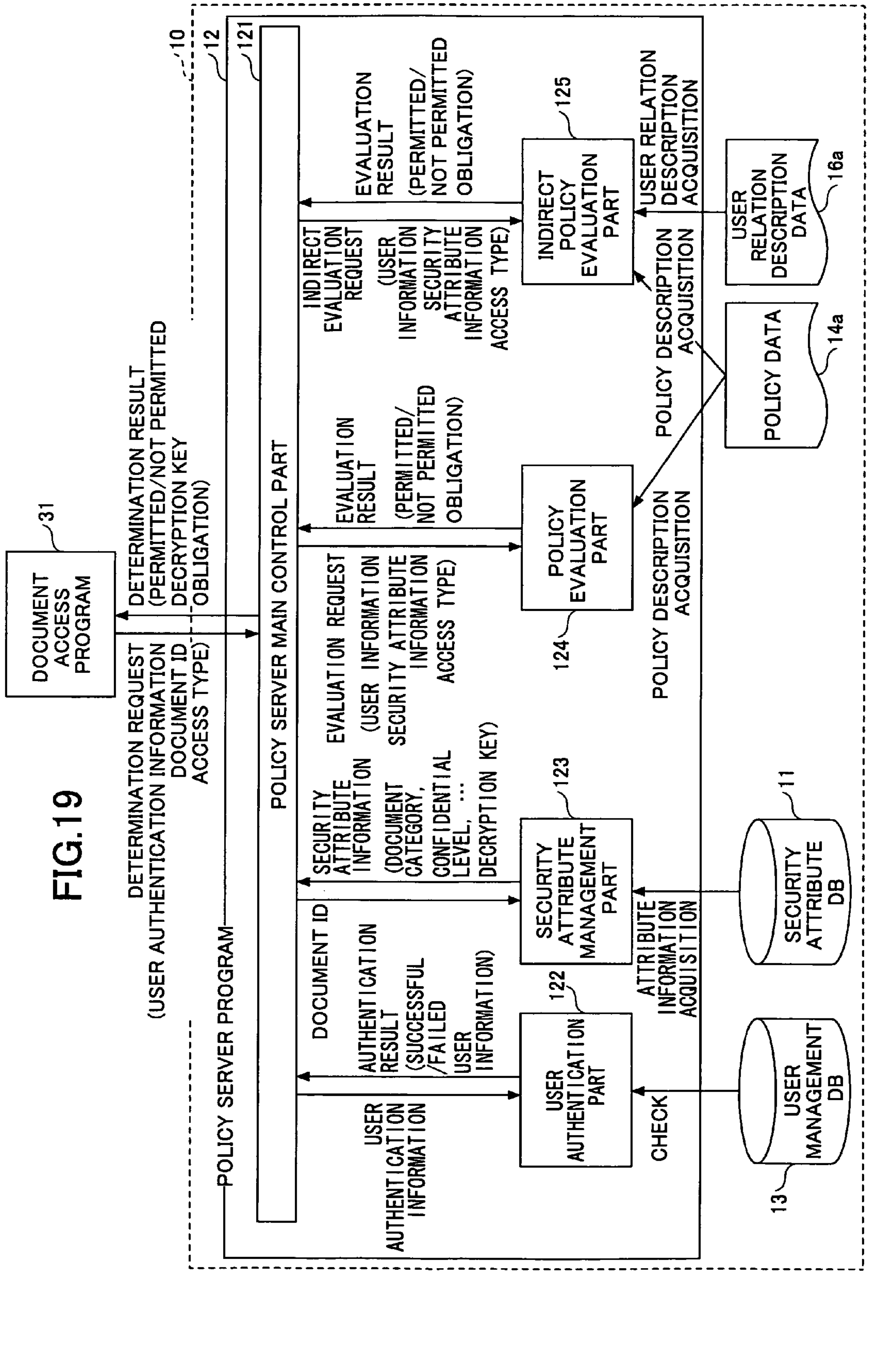
FIG. 19 is a functional diagram of a policy server according to a second embodiment.

The following describes a second embodiment. FIG. 19 is a functional diagram of a policy server 10 according to the second embodiment. In FIG. 19, components identical to those in FIG. 5 are denoted by the same reference numerals, and are not further described.

In FIG. 19, policy data 14*a* correspond to the policy data 14 and the indirect policy data 15 of FIG. 5. The policy data 14*a* is referred to by both the policy evaluation part 124 and the indirect policy evaluation part 125. As the policy evaluation part 124 and the indirect policy evaluation part 125 refer to the same policy data 14*a*, the indirect policy evaluation part 125 does not send a query to the policy evaluation part 124.

In the second embodiment, other components of the document access control system 1 may be the same as the corresponding components in the first embodiment.

In the second embodiment and the embodiments that follow, only a user relationship based on an organizational structure is referred to in order to avoid redundant explanation. User relation description data 16*a* of FIG. 19 provide a user relation description 161*a* based on an organizational structure.

FIG. 20 shows an example of the user relation description 161*a* based on an organizational structure according to the second embodiment.

Similar to the user relation description 161 of FIG. 11, the user relation description 161*a* of FIG. 20 describes the organizational structure shown in FIG. 9. However, while the user relation description 161 of the first embodiment is in a general-purpose description format that can be used for describing not only organization structures but also other user relationships, the user relation description 161*a* of the second embodiment is in a description format dedicated to description of organizational structures. Accordingly, tags with tag names specific to organizational structures, such as "Organization", are used in the user relation description 161*a*. If user relationships are limited to particular relationships and system extensibility is not required, a user relation description in a description format dedicated for describing particular user relationships as shown in FIG. 20 may be used.

With reference to FIG. 20, the user relation description 161*a* includes an Organization element as a route element. The Organization element describes an organization, and may include a Name element and a Members element as child elements. The Organization element may further recursively include Organization elements as child elements corresponding to organizations that belong to the upper organization indicated by the upper Organization element.

The Name element indicates the name of an organization. The Policy element indicates members, and includes one or more Person elements as child elements. Each Person element indicates a member (user), and includes a Name element and a Role element as child elements. The Name element indicates the name of the member. The Role element indicates a relationship of the user indicated by the corresponding Person element with another user, and includes a Type element and a Target element as child elements. The Role element is basically the same as the Role element in the user relation description of the first embodiment. However, the Role element including a Type element of "MANAGER" does not include a Target element because it is obvious that the role target users are the members belonging to the same organization as the user assigned to "MANAGER".

For example, in the user relation description 161*a* of FIG. 20, a Name element n1 indicates that an Organization element or1 describes the product design department. The Organization element or1 includes a Members element m11, an Organization element or11, and an organization element or12. This indicates that bucho, jicho, hisho, the first design section, and the second design section belong to the product design department.

In a Role element r11 in a Person element p11, the value of a Type element is "MANAGER". That is, the Role element r11 indicates that a user (bucho) has a relationship (role) as MANAGER with respect to all the users belonging to the product design department.

In a Role element r12 in a Person element p12, the value of a Type element is "SECRETARY", and the value of a Target element is "bucho". This indicates that a user (hisho) corresponding to the Person element p12 has a relationship (role) as SECRETARY with respect to bucho.

FIGS. 21 and 22 show an example of a policy description 141*a* in the policy data 14*a* according to the second embodiment.

Since the description format of the policy description 141*a* of the second embodiment is mostly the same as the policy description 141 of the first embodiment, the policy description 141*a* is not fully explained herein. The following describes differences with the first embodiment.

The first difference is that the policy description 141*a* shown in FIGS. 21 and 22 includes a combination of contents in the policy data 14 and the indirect policy data 15 of the first embodiment. In the first embodiment, definitions for the related persons and the principal are included in the policy data 14, and the definitions for other users (MANAGER, ACTING_MANAGER, SECRETARY, etc.) are included in the indirect policy data 15. On the other hand, in the second embodiment, definitions for the related persons, the principal, and the other users are included in the policy data 14*a*.

For example, a Rule element r2 of FIG. 21 includes an AccessControl element a21 describing a definition for PRINCIPAL and an AccessControl element a22 describing a definition for MANAGER.

The second difference is that a SameAs element is used in place of a SameAsTheRoleTarget. However, the function of the SameAs is the same as the function of the SameAsTheRoleTarget. That is, the SameAs element is for defining that the same right as a user having a role indicated by SameAs element is given to a user having a role indicated by a Role element. For example, in FIG. 21, a SameAs element s22 with a value of PRINCIPAL indicates that the same right as a user having a role of PRINCIPAL is given to a user having a role of MANAGER.

The following describes operations performed by the indirect policy evaluation part 125 in the second embodiment. It is to be noted that the operations performed by the policy evaluation part 124 is the same as in the first embodiment, and are not described herein.

Figure 23:
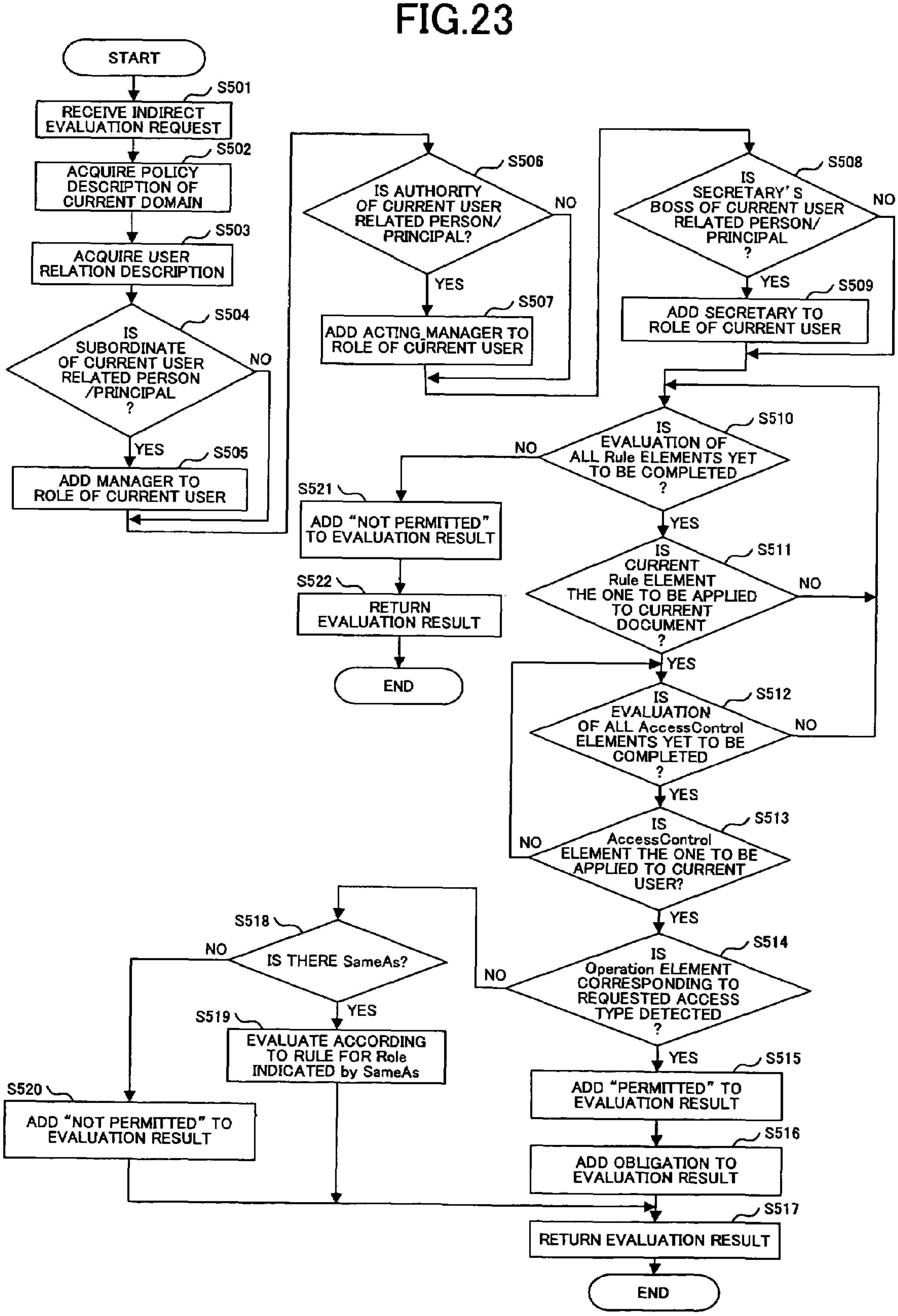
FIG. 23 is a flowchart illustrating indirect access right evaluation by an indirect policy evaluation part according to the second embodiment.

FIG. 23 is a flowchart illustrating indirect access right evaluation by the indirect policy evaluation part 125 according to the second embodiment.

When an indirect evaluation request containing user information, security attribute information, and the access type is received from the policy server main control part 121 (S501), the policy data 14*a* corresponding to the domain contained in the security attribute information are acquired so as to read the policy description 141*a* in the policy data 14*a* (S502). Then, user relation description data 16*a* are acquired so as to read the user relation description 161*a* (S503).

In the user relation description 161*a*, if a user attempting to access (hereinafter referred to as a "current user") has a role of "MANAGER", it is determined whether there is a related person or a principal of a document being accessed (hereinafter referred to as a "current document") among subordinates of the current user (S504). More specifically, user names indicated by Person elements in a Members element or an Organization element as child elements of the organization (an Organization element) with respect to which the current user has a role of MANAGER are recursively listed so as to generate a subordinate list. If any of the user names on the subordinate list is contained as a related person/principal in the security attribute information, it is determined that there is a related person or a principal of the current document among subordinates of the current user.

If the determination in Step S504 is affirmative (Yes in S504), MANAGER is added to the role of the current user (S505).

Then, in the user relation description 161*a*, if the current user has a role of "ACTING_MANAGER", it is determined whether there is a related person or a principal of the current document among users (hereinafter referred to as "authorities") for whom the current user can act (S506). More specifically, user names indicated by a Target element in a Role element in a Person element corresponding to the current user are listed so as to generate an authority list. If any of the user names on the authority list is contained as a related person/principal in the security attribute information, it is determined that there is a related person or a principal of the current document among the authorities of the current user.

If the determination in Step S506 is affirmative (Yes in S506), ACTING_MANAGER is added to the role of the current user (S507).

Then, in the user relation description 161*a*, if the current user has a role of "SECRETARY", it is determined whether there is a related person or a principal of the current document among users (hereinafter referred to as "secretary's bosses") to whom the current user works as a secretary (S508). More specifically, user names indicated by a Target element in a Role element in a Person element corresponding to the current user are listed so as to generate a secretary's boss list. If any of the user names on the secretary's boss list is contained as a related person/principal in the security attribute information, it is determined that there is a related person or a principal of the current document among the secretary's bosses of the current user.

If the determination in Step S508 is affirmative (Yes in S508), SECRETARY is added to the role of the current user (S509).

Then, a loop process for sequentially processing Rule elements in the policy description 141*a* is performed (S510). The Rule element being processed in the loop process is hereinafter referred to as a "current Rule element".

It is determined whether the current Rule element is the rule to be applied to the current document (S511). The determination is made in the same way as in the first embodiment. If the current Rule element is not determined to be the rule to be applied to the current document (No in S511), the next Rule element is processed as a current Rule element.

If the current Rule element is the rule to be applied to the current document (Yes in S511), an AccessControl element to be applied to the current user is searched for among AccessControl elements in the current Rule element (S512, S513). The AccessControl element to be applied to the current user is the one whose Role element has the value corresponding to the role assigned to the current user in Steps S504 through S509. If none of the AccessControl elements is the one to be applied to the current user (No in S512), the next Rule element is processed.

If the AccessControl element to be applied to the current user is detected (Yes in S513), an Operation element corresponding to the requested access type is searched for in an Operations element in the current AccessControl element (S514).

If the Operation element corresponding to the requested access type is detected (Yes in S514), "Permitted" is added to an evaluation result (S515). Then the obligation defined in an Obligation element in the Operation element is added to the evaluation result (S516). The evaluation result is returned to the policy server main control part 121 (S517), and thus the process ends.

If, on the other hand, the Operation element corresponding to the requested access type is not detected (No in S514), a SameAs element is searched for in the Operations elements in the current AccessControl element (S518). If a SameAs element is detected in the Operations element (Yes in S518), the access right of the current user is evaluated based on an AccessControl element corresponding to the role indicated by the value of the SameAs element (S519). Then the evaluation result is returned to the policy server main control part 121 (S517).

If, on the other hand, an Operation element including a SameAs element is not detected (No in S518), "Not permitted" is added to an evaluation result (S520). Then the evaluation result is returned to the policy server main control part 121 (S517).

For example, kacho 1 attempts to read a document with the confidential level of "SECRET", the document category of "HUMAN_RESOURCE", and the related persons/principal of "kain 12". As kacho 1 is not a related person/principal of the current document, an evaluation result by the policy evaluation part 124 is "Not permitted".

Then, a request for evaluation of kacho 1 is sent to the indirect policy evaluation part 125. As shown in the user relation description 161*a* (FIG. 20) in the user relation description data 16*a*, a Person element p13 corresponding to kacho 1 includes a Role element including a Type element with a value of "MANAGER". It is also shown that kacho 1 belongs to the first design section. Accordingly, a subordinate list of kacho 1 contains kain 11, kain 12, and kain 13, who belong to the first design section. As kain 12 is a related person/principal of SEC000123, a role of MANAGER is assigned to kacho 1.

Based on the document category (HUMAN_RESOURCE) and the confidential level (SECRET) of the document SEC000123, the Rule element r2 (FIG. 21) including a DocCategory element of HUMAN_RESOURCE and a Sensitivity element of SECRET is applied in the policy description 141*a* in the policy data 14*a*.

Further, in the Rule element r2, an AccessControl element a22 including a Role element with a value of MANAGER is applied. The AccessControl element a22 includes an Operations element including a SameAs element s22 as a child element. Accordingly, the access right is evaluated based on an AccessControl element a21 corresponding to the value PRINCIPAL of the SameAs element s22.

The following describes a third embodiment. In the second embodiment, the policy evaluation part 124 and the indirect policy evaluation part 125 refer to the same policy data 14*a*. However, as in the first embodiment, the policy evaluation part 124 and the indirect policy evaluation part 125 do not have to refer to the same policy data 14*a*. In view of that, in the third embodiment, the policy data 14*a* are divided into policy data 14*b* used by the policy evaluation part 124 and indirect policy data 15*b* used by the indirect policy evaluation part 125.

Figure 24:
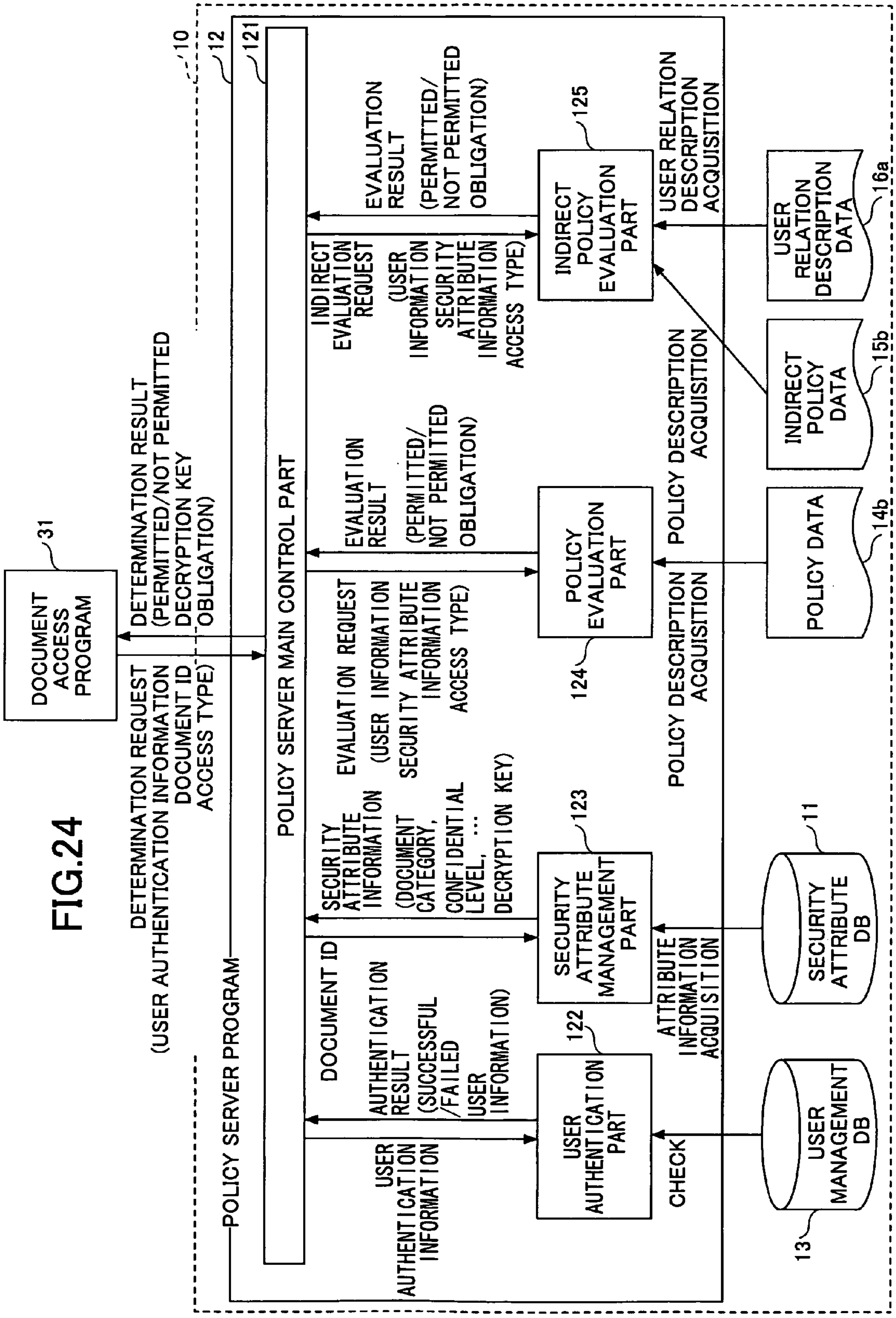
FIG. 24 is a functional diagram of a policy server according to a third embodiment.

FIG. 24 is a functional diagram of a policy server 10 according to the third embodiment. In FIG. 24, components identical to those in FIGS. 19 and 5 are denoted by the same reference numerals, and are not further described.

The difference with the second embodiment is that the policy evaluation part 124 and the indirect policy evaluation part 125 shown in FIG. 24 refer to different sets of policy data. More specifically, the policy evaluation part 124 refers to the policy data 14*b*, while the indirect policy evaluation part refers to the indirect policy data 15*b*.

In this case, the policy data 14*b* may contain only descriptions for related persons and principals. FIG. 25 shows a policy description 141*b* of the policy data 14*b* according to the third embodiment.

The policy description 141*b* of FIG. 25 defines three Rule elements (r1, r2, and r3). As is obvious from Role elements r11, r21, and r31, the Rule elements r1, r2, and r3 provide definitions for RELATED_PERSONS (related persons) and PRINCIPAL (principal). That is, the policy description 141*b* corresponds to the Rule elements for the related persons and the principal in the policy data 14*a* of the second embodiment. The description format of the policy description 141*b* is the same as the above-described embodiments, and is not further described herein.

FIGS. 26 and 27 show an example of an indirect policy description 151*b* in the indirect policy data 15*b* according to the third embodiment. The indirect policy description 151*b* shown in FIGS. 26 and 27 correspond to Rule elements in the policy data 14*a* of the second embodiment necessary for evaluation of users excluding the related persons and principals.

A Rule element r1 in the indirect policy description 151*b* includes an AccessControl all for PRINCIPAL in addition to an AccessControl element a12 for MANAGER. This is because a SameAs element s1 in the AccessControl element a12 needs to refer to a definition for PRINCIPAL.

The third embodiment is the same as the second embodiment except that the policy evaluation part 124 and the indirect policy evaluation part 125 read the policy data 14*b* and the indirect policy data 15*b*, respectively. Accordingly, the operations to be performed by the policy evaluation part 124 and the indirect policy evaluation part 125 are not described herein.

The following describes a fourth embodiment. As described above, in the third embodiment, the indirect policy data 15*b* include the AccessControl element for a principal or related person to be referred to by the SameAs element. This AccessControl element for a principal or related person is also included in the policy data 14*b*. The fourth embodiment is an example in which description in the indirect policy data 15*b* of the third embodiment is simplified.

Figure 28:
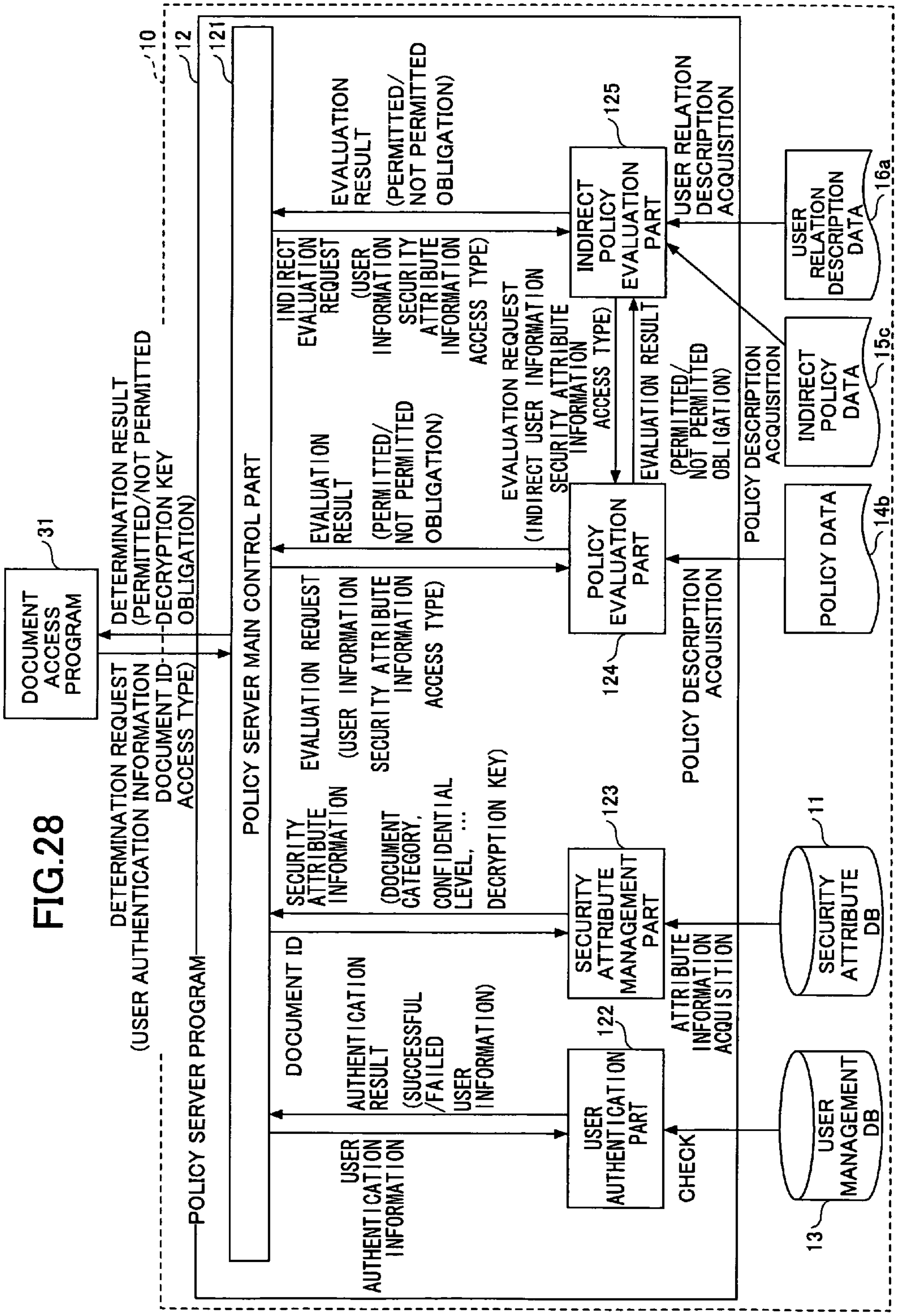
FIG. 28 is a functional diagram of a policy server according to a fourth embodiment.

FIG. 28 is a functional diagram of a policy server 10 according to the fourth embodiment. In FIG. 28, components identical to those in FIGS. 24 and 5 are denoted by the same reference numerals, and are not further described. Indirect policy data 15*c* shown in FIG. 28 is simplified compared to the indirect policy data 15*b* of the second embodiment.

FIG. 29 shows an example of an indirect policy description 151*c* in the indirect policy data 15*c* according to the fourth embodiment. In the indirect policy description 151*c* shown in FIG. 29, a Rule element r1 and a Rule element r2 include a SameAs element S11 and SameAs elements s21-s23, respectively, but do not include any AccessControl elements for PRINCIPAL to be referred to by the SameAs elements s11 and s21-s23. This is because evaluation of PRINCIPAL is performed based on the policy data 14*b*. That is, the indirect policy description 151*c* corresponds to the indirect policy description 151*b* of the third embodiment from which definitions for related persons/principal are deleted. Accordingly, the indirect policy evaluation part 125 needs to query the policy evaluation part 124 for evaluation of the access right given to an element referred to by the SameAs element. The arrows between the indirect policy evaluation part 125 and the policy evaluation part 124 in FIG. 28 represent a query and a response to the query.

It is to be noted that, in the indirect policy description 151*c*, all the Roll elements include the Operations elements that include SameAs elements. That is, the indirect policy description 151*c* defines that users having a predetermined relationship with a related person or a principal have the same right as the related persons or the principals.

The operations performed by the indirect policy evaluation part 125 in the fourth embodiment are different from the third embodiment in that the evaluation of SameAs elements is performed by the policy evaluation part 124. Operations performed by the policy evaluation part 124 are the same as in the second and third embodiments.

Figure 30:
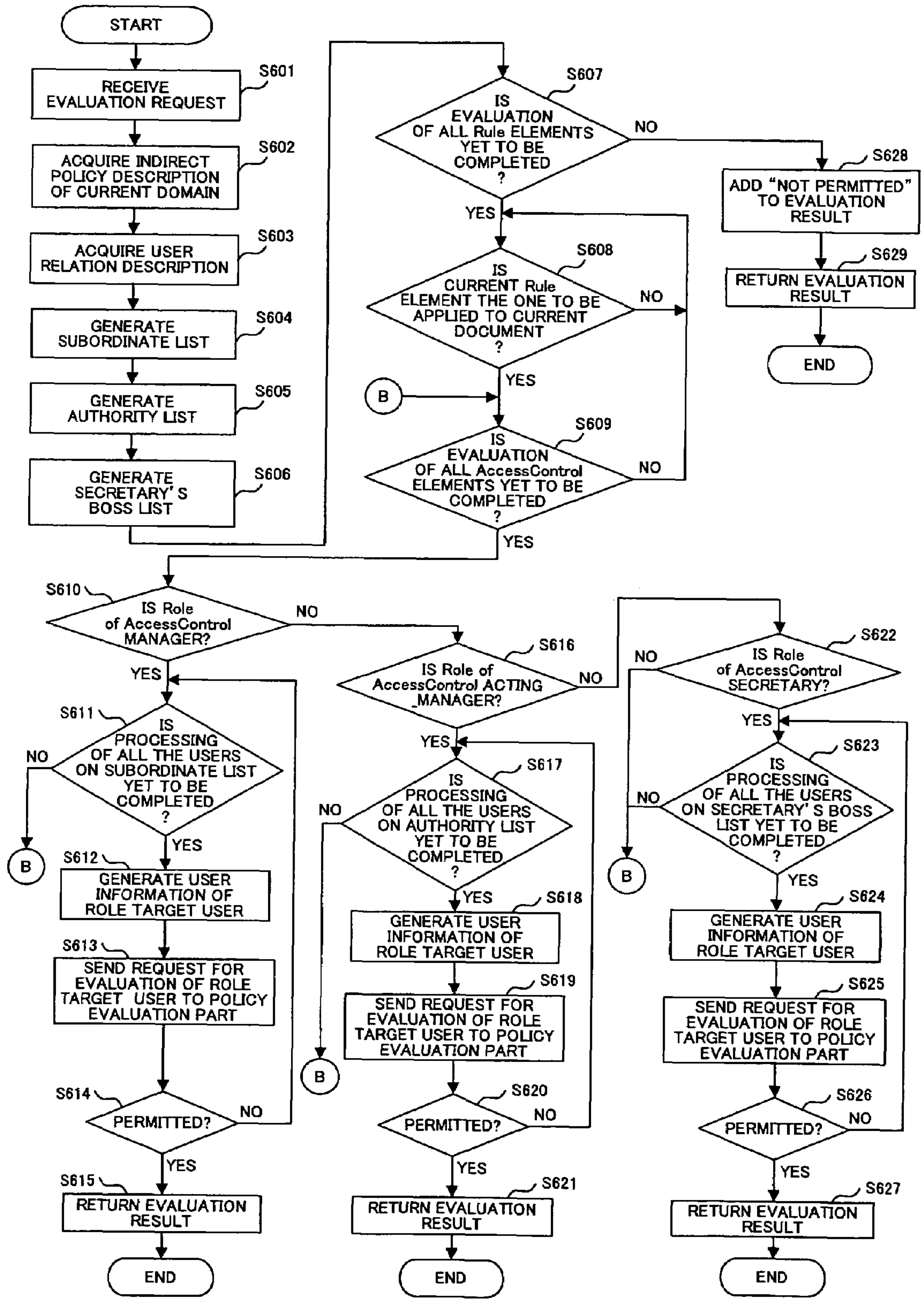
FIG. 30 is a flowchart illustrating indirect access right evaluation by an indirect policy evaluation part according to the fourth embodiment.

FIG. 30 is a flowchart illustrating indirect access right evaluation by the indirect policy evaluation part 125 according to the fourth embodiment.

When an indirect evaluation request containing user information, security attribute information, and the access type is received from the policy server main control part 121 (S601), the indirect policy data 15*c* corresponding to the domain contained in the security attribute information are acquired so as to read the indirect policy description 151*c* in the indirect policy data 15*c* (see FIG. 29) (S602). Then, the user relation description data 16*a* are acquired so as to read the user relation description 161*a* (FIG. 20) (S603).

In the user relation description 161*a*, if a user attempting to access (hereinafter referred to as a "current user") has a role of "MANAGER", user names indicated by Person elements in a Members element or an Organization element as child elements of the organization (an Organization element) with respect to which the current user has a role of MANAGER are recursively listed so as to generate a subordinate list (S604).

Then, in the user relation description 161*a*, if the current user has a role of "ACTING_MANAGER", user names indicated by a Target element in a Role element in a Person element corresponding to the current user are listed so as to generate an authority list. (S605).

Then, in the user relation description 161*a*, if the current user has a role of "SECRETARY", user names indicated by a Target element in a Role element in a Person element corresponding to the current user are listed so as to generate a secretary's boss list. (S606).

Then, a loop process for sequentially processing Rule elements in the indirect policy description 151*c* is performed (S607). The Rule element being processed in the loop process is hereinafter referred to as a "current Rule element".

It is determined whether the current Rule element is the rule to be applied to the current document (S608). The determination is made in the same way as in the first embodiment. If the current Rule element is not determined to be the rule to be applied to the current document (No in S608), the next Rule element is processed as a current Rule element.

If the current Rule element is the rule to be applied to the current document (Yes in S608), a loop process for sequentially processing AccessControl elements in the current Rule element is performed (S609). The AccessControl element being processed in the loop process is hereinafter referred to as a "current AccessControl element".

The value of a Role element (hereinafter referred to as a "current Role element") of the current AccessControl element (S610, S616, S622) is determined.

User information of each of the users (hereinafter referred to as "role target users") on the subordinate list, the authority list, or the secretary's boss list (S611, S617, or S623) is generated (S612, S618, or s624) depending on the value of the current Role element (MANAGER, ACTING_MANAGER, or SECRETARY). A request of access right evaluation of the role target users containing the generated user information, security information, and the access type is output to the policy evaluation part 124 (S613, S619, or S625).

If any of the role target users is determined to have an access right by the policy evaluation part 124 (Yes in S614, S620, or S626) the evaluation result of the role target user by the policy evaluation part 124 is returned to the policy server main control part 121 as the evaluation result by the indirect policy evaluation part 125 (S615, S621, or S627). If the policy evaluation part 124 determines that none of the role target users have an access right (No in S611, S617, or S623), the next AccessControl element in the current Rule element is processed.

If none of the AccessControl elements is the one to be applied to the current user (No in S609), the next Rule element is processed. If none of the Rule elements is the one to be applied (No in S607), "Not permitted" is added to an evaluation result (S628). Then the evaluation result is returned to the policy server main control part 121 (S629).

The following describes a fifth embodiment. In the first through fourth embodiments, the policy evaluation part 124 and the indirect policy evaluation part 125 are illustrated as functional modules (e.g. libraries, functions, or the like) independent from each other. However, the policy evaluation part 124 and the indirect policy evaluation part 125 do not have to be independent from each other, and may be integrated into one functional module having functions of both parts 124 and 125. The fifth embodiment is an example in which the policy evaluation part 124 and the indirect policy evaluation part 125 are integrated.

Figure 31:
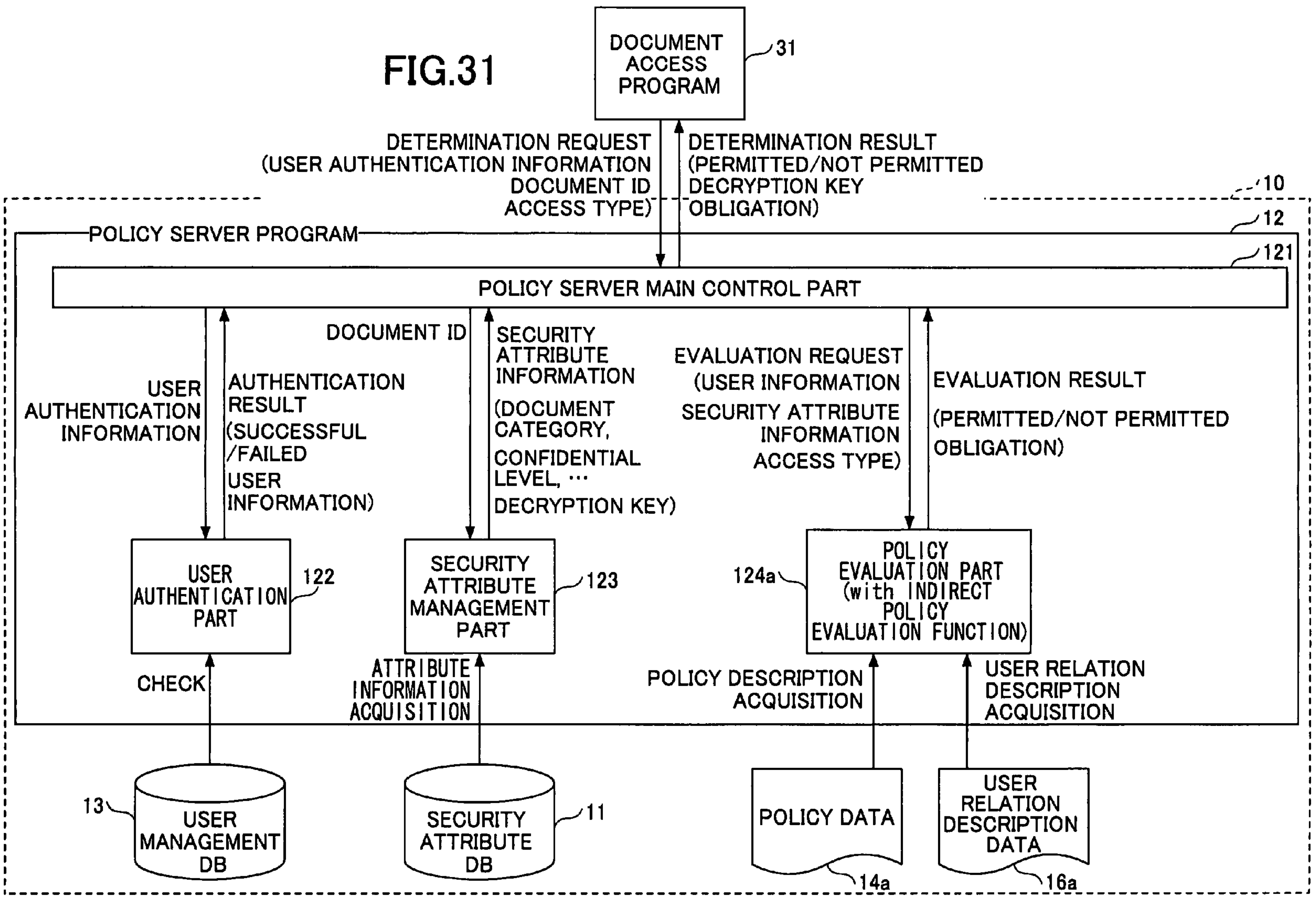
FIG. 31 is a functional diagram of a policy server according to a fifth embodiment.

FIG. 31 is a functional diagram of a policy server 10 according to the fifth embodiment. In FIG. 31, components identical to those in FIG. 19 are denoted by the same reference numerals, and are not further described.

With reference to FIG. 31, a policy evaluation part 124*a* has the functions of both the policy evaluation part 124 and the indirect policy evaluation part 125. In other words, the policy evaluation part 124*a* evaluates not only access rights of a principal or related persons, but also evaluates indirect access rights.

Figure 32:
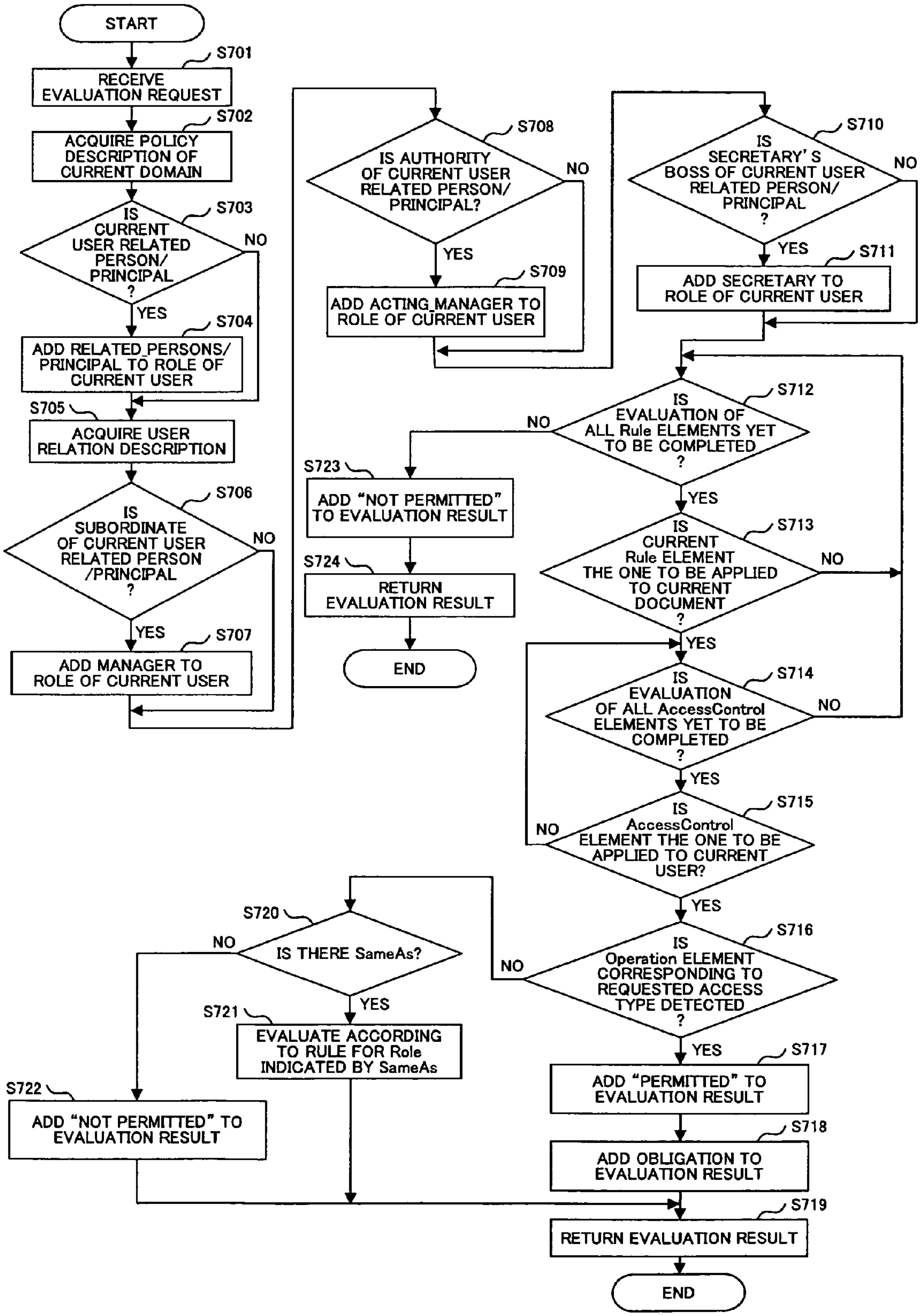
FIG. 32 is a flowchart illustrating access right evaluation by a policy evaluation part according to the fifth embodiment.

FIG. 32 is a flowchart illustrating access right evaluation to be performed by the policy evaluation part 124*a* according to the fifth embodiment.

The operations shown in the flowchart of FIG. 32 is very similar to the operations (FIG. 23) by the indirect policy evaluation part 125 in the second embodiment. Accordingly, the flowchart of FIG. 32 is described base on differences from the flowchart of FIG. 32.

In the operations shown in FIG. 23, a role (MANAGER, ACTING_MANAGER, or SECRETARY) is assigned to a current user depending on whether a role target user of the current user is a related person or a principal of a current document, and evaluation is performed according to an AccessControl element corresponding to the role assigned to the current user.

In the operations shown in FIG. 32, in addition to the operations shown in FIG. 23, it is determined whether the current user itself is a principal or a related person (S703) and, if the determination is affirmative, the current user is assigned to RELATED_PERSONS/PRINCIPAL (S704). Thus, in the determination made in Step S715, an AccessControl element including a Role element with a value of RELATED_PERSONS or PRINCIPAL is applied to the current user. Thus, not only indirect rights shown in FIG. 23 but also direct access right of a principal and related persons are evaluated.

In the second through fifth embodiments, only the user relationship based on the organizational structure is referred to, but evaluation of indirect access rights based on other user relationships can be performed according to the same principle.

For example, in the case where a user relation description 171*a* based on a seating layout is applied, user relation description data may be defined as follows.

Figure 33:
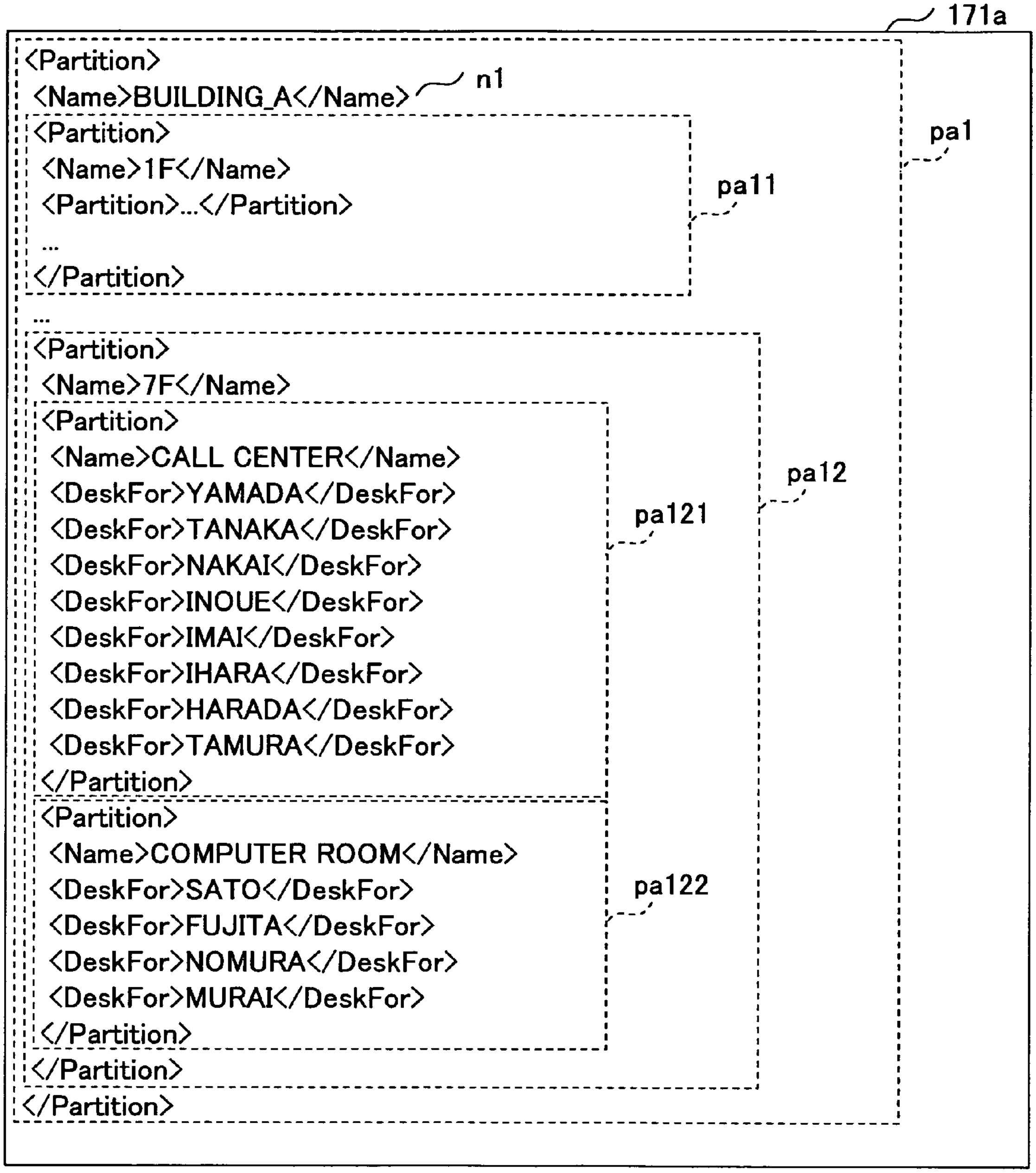
FIG. 33 shows an example of a user relation description based on a seating layout according to the second embodiment and the embodiments that follow.

FIG. 33 shows an example of the user relation description 171*a* based on a seating layout according to the second embodiment and the embodiments that follow.

Similar to the user relation description 171 of FIG. 12, the user relation description 171*a* of FIG. 33 describes the seating layout shown in FIG. 10. However, while the user relation description 171 of the first embodiment is in a general-purpose description format that can be used for describing not only seating layouts but also other user relationships, the user relation description 171*a* of the second embodiment is in a description format dedicated to description of seating layouts. Accordingly, tags with tag names specific to seating layouts, such as "Partition", are used in the user relation description 171*a*.

With reference to FIG. 33, the user relation description 171*a* includes a Partition element as a route element. The Partition element describes a spatial segment (block). In this embodiment, a spatial segment indicates a building, a floor of a building, or a partition on a floor. In the following description, these spatial segments are called as "partitions".

A partition element may include a Name element and DeskFor elements as child elements. The Partition element may further recursively include Partition elements as child elements corresponding to partitions that are included in the upper partition indicated by the upper Partition element.

The Name element indicates the name of the partition (partition name). Each DeskFor element represents a seat allocated to a user, and a value thereof indicates the name of the user of the seat.

For example, in the user relation description 171*a* of FIG. 33, a Name element n1 indicates that a Partition element pal describes the building A. Partition elements pall and pa12 included as child elements of the Partition element pal describe floors of the building A. The partition element pa12 corresponding to the seventh floor includes Partition elements pa121 and pa122.

The Partition element pa121 describes the call center, and includes DeskFor elements indicating users who have seats in the call center.

The Partition element pa122 describes the computer room, and includes DeskFor elements indicating users who have seats in the computer room.

The user relation description 171*a* includes no Role elements. This is because roles of users can be clearly identified without being defined by Role elements. More specifically, a user in a building has a role of "SAME_BUILDING" with respect to all the users in the same building. Similarly, a user on a floor has a role of "SAME_FLOOR" with respect to all the users on the same floor, and a user in a partition (the term "partition" as used herein indicates an area of a floor divided by partitions) has a role of "SAME_PARTITION" with respect to all the users in the same partition.

FIGS. 34 and 35 show an example of a policy description 141*c* in policy data 14*c*. While the policy description 141*a* shown in FIGS. 21 and 22 is for the user relationship based on the organizational structure, the policy description 141*c* shown in FIGS. 34 and 35 is for the user relationship based on the seating layout shown in FIG. 33. As the description format of the policy description 141*c* is the same as the policy description 141*a*, contents of the policy description 141*c* are not described herein.

Figure 36:
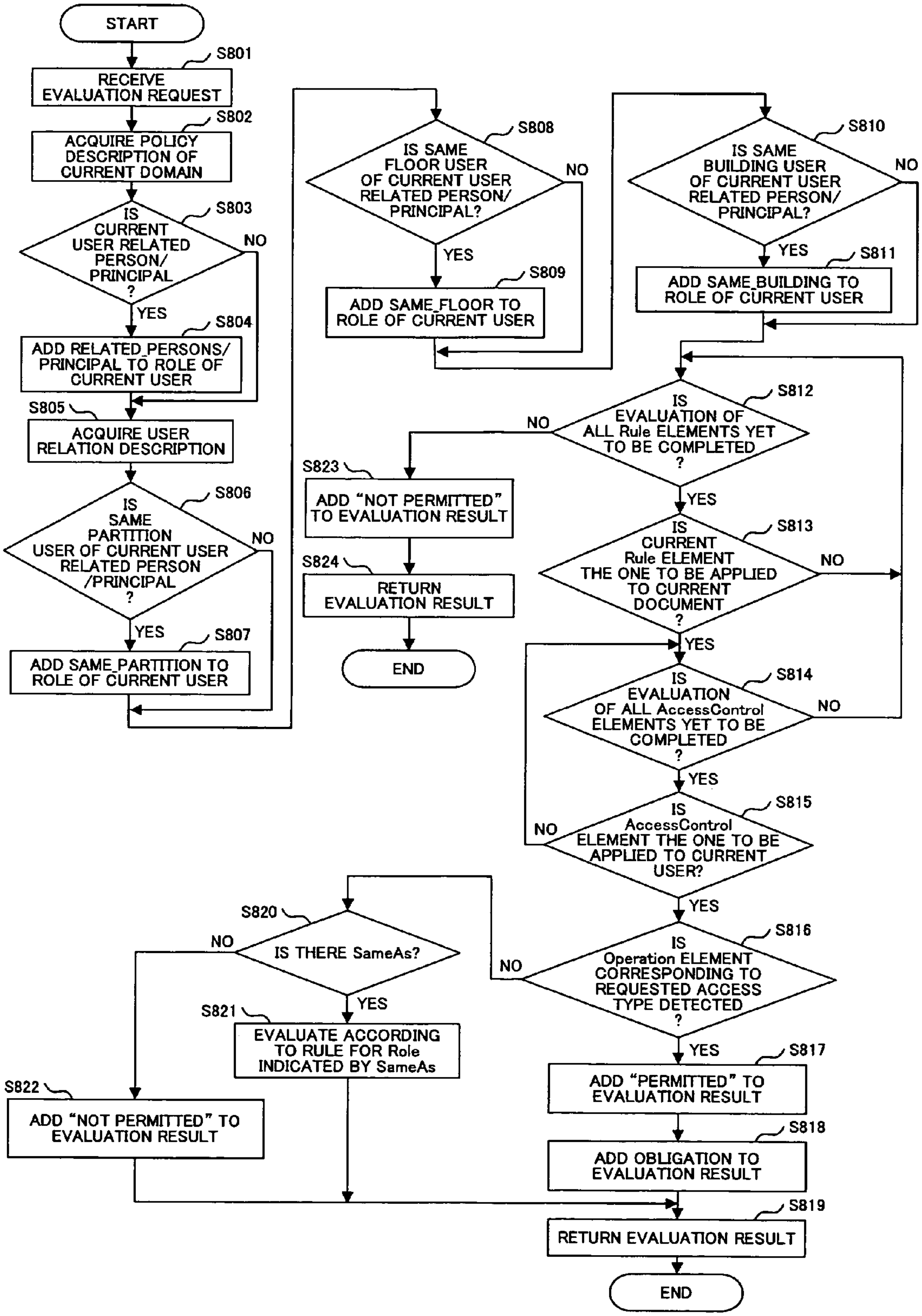
FIG. 36 is a flowchart illustrating access right evaluation based on a seating layout by a policy evaluation part according to the fifth embodiment.

FIG. 36 shows an operation procedure of the policy evaluation part 124*a* in the case where the user relation description 171*a* of FIG. 33 and the policy description 141*c* of FIGS. 34 and 35 are applied to the policy server 10 (FIG. 31) of the fifth embodiment.

FIG. 36 is a flowchart illustrating access right evaluation based on the seating layout by the policy evaluation part 124*a* according to the fifth embodiment.

The operations shown in FIG. 36 are the same as those shown in FIG. 32 except that the role to be evaluated corresponds to the seating layout (SAME_BUILDING, SAME_FLOOR, OR SAME_PARTITION), and are not further described herein.

With access control according to a user relationship based on the seating layout, flexible actions can be taken. For example, a confidential protected document related to an information system in which network composition information is described is distributed to Mr. Sato and Mr. Fujita in charge of network management of information systems, Mr. Sato and Mr. Fujita can show the document to the people in the computer room for consultation. At the same time, security management for preventing unauthorized distribution of the document can be realized.

Figure 37:
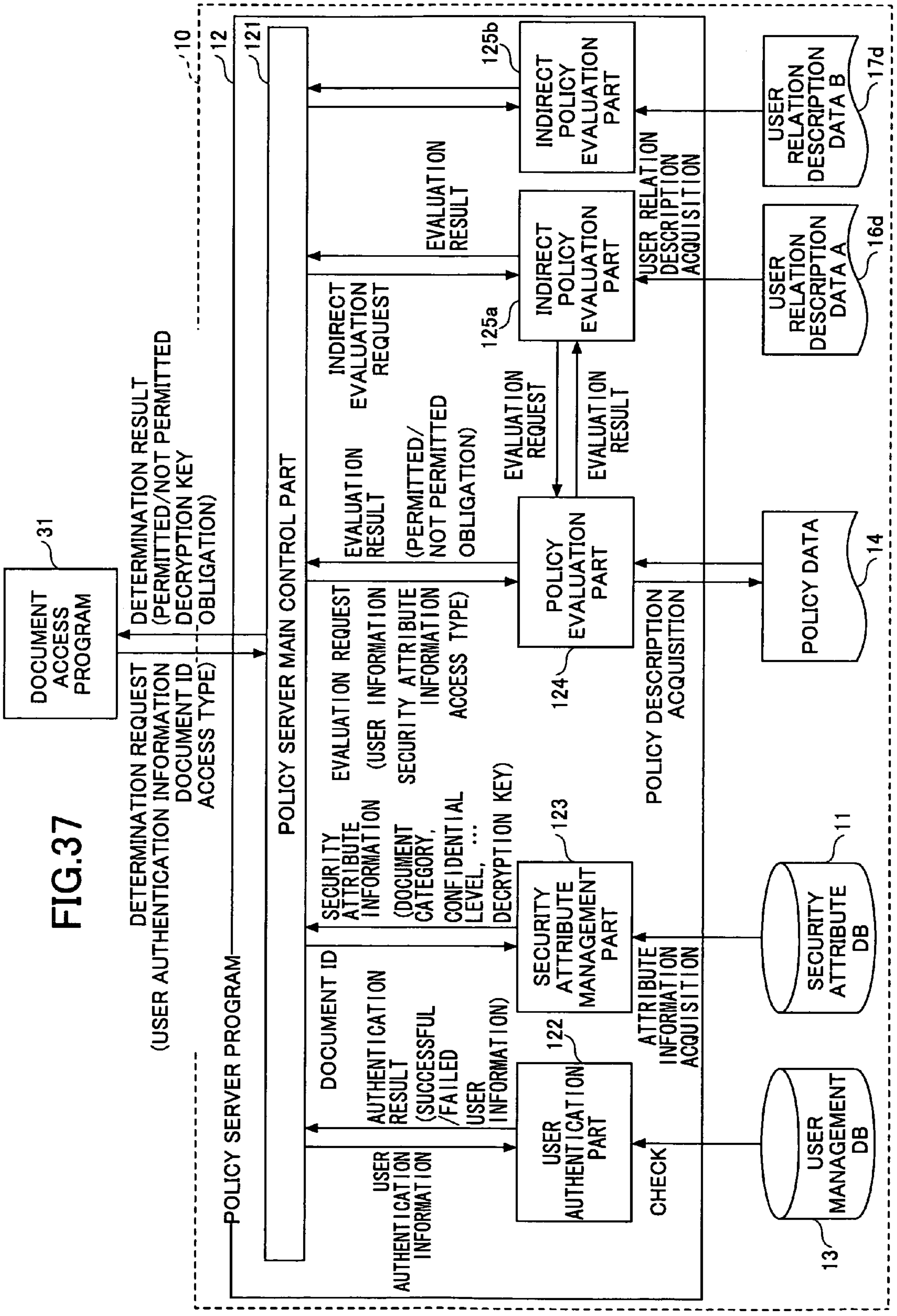
FIG. 37 is a functional diagram of a policy server according to a sixth embodiment.

The following describes a sixth embodiment. FIG. 37 is a functional diagram of a policy server 10 according to the sixth embodiment. In FIG. 37, components identical to those in FIGS. 28 and 31 are denoted by the same reference numerals, and are not further described.

With reference to FIG. 37, user relation description data A 16*d* and user relation description data B 17*d* define different user relationships. For example, the user relation description data A 16*d* define a user relationship based on an organizational structure, while the user relation description data B 17*d* define a user relationship based on a seating layout. The user relation description data A 16*d* and the user relation description data B 17*d* may be in any of the description formats of the first through fifth embodiments or in other description formats.

An indirect policy evaluation part 125*a* and an indirect policy evaluation part 125*b* correspond to the indirect policy evaluation part 125 of the above-described embodiments, and evaluate indirect access rights based on user relationships. The indirect policy evaluation part 125*a* performs evaluation based on the user relation description data A 16*d*, while the indirect policy evaluation part 125*b* performs evaluation based on the user relation description data B 17*d*.

That is, the policy server 10 of the sixth embodiment includes one indirect policy evaluation part for each set of user relation description data. If an evaluation result by the policy evaluation part 124 is negative, the policy server main control part 121 sequentially or parallelly uses plural indirect policy evaluation parts registered in advance. If an affirmative evaluation result is obtained from any of the indirect policy evaluation parts, the policy server main control part 121 returns information indicating that the access is permitted to the document access program 31. If, on the other hand, the access is not permitted by any of the indirect policy evaluation parts, the policy server main control part 121 returns information indicating that the access is not permitted to the document access program 31.

Procedures of access right evaluation by the policy evaluation part 124 and the indirect policy evaluation parts 125*a* and 125*b* are obvious from the description in the above embodiments, and are not described herein.

While the user relation description data are defined using XML (extensible Markup Language) in the above described embodiments, the user relation description data may be defined using other formats. For example, in the case where organization structures are managed using directory servers or the like, data generated by a tool that outputs information in directory trees may be used.

Also, applications that can output illustrated organization charts in XML are commercially available. Data output using such applications may be used as user relation description data.

It should be understood that the present invention is not limited to the specifically disclosed embodiment, and variations and modifications may be made without departing from the scope of the present invention.

The present application is based on Japanese Priority Application No. 2005-144602 filed on May 17, 2005, with the Japanese Patent Office, the entire contents of which are hereby incorporated by reference.

The invention claimed is:

1. An access control apparatus that controls access to a predetermined resource, comprising:

user relationship definition information defining a predetermined relationship of a user attempting to access the predetermined resource with a further user which is different from the user attempting to access;

indirect access control information defining an access right to the predetermined resource based on the predetermined relationship;

an indirect access right determining unit that detects the further user with which the user has the predetermined relationship based on the user relationship definition information, and determines an access right of the user based on the predetermined relationship with the detected further user and the indirect access control information, direct access control information defining the access right to the predetermined resource on a per user basis or on a per user category basis; and a direct access right determining unit that determines the access right of the user based on the direct access control information, wherein the indirect access right determining unit determines the access right of the user based on an access right of the further user which further user access right is determined based on the direct access control information, wherein, if a determination result by the direct access right determining unit is negative, the indirect access right determining unit determines the access right of the user.

2. The access control apparatus as claimed in claim 1, wherein the indirect access right determining unit grants the user the access right that is granted to the further user based on the direct access control information.

3. The access control apparatus as claimed in claim 2, wherein, if the indirect access control information defines that the same access right as the access right granted to the further user is granted to the user based on the predetermined relationship of the user with the further user, the indirect access right determining unit grants the user the access right that is granted to the further user based on the direct access control information.

4. The access control apparatus as claimed in claim 1, wherein the indirect access right determining unit recognizes the access right granted to the further user based on the direct access control information by querying the direct access right determining unit for the access right granted to the further user.

5. The access control apparatus as claimed in claim 1, wherein the user relationship definition information defines the relationship between the user and the further user based on a structure of an organization to which the user and further user belong.

6. The access control apparatus as claimed in claim 5, wherein the relationship between the user and the further user may include at least one of a relationship between a boss and a subordinate thereof, a relationship between a secretary and a boss thereof, and a relationship between a deputy and a person for whom the deputy acts.

7. The access control apparatus as claimed in claim 1, wherein the user relationship definition information defines the relationship between the user and the further user based on positions of seats allocated to the user and further user.

8. The access control apparatus as claimed in claim 7, wherein the relationship between the user and the further user is a relationship based on whether the seats are arranged in the same segment.

9. The access control apparatus as claimed in claim 1, further comprising:

an electronic data attribute management unit that, in response to a request for saving an identification information item of an encrypted electronic data item and a decryption key for the electronic data item, manages the identification information item of the electronic data item and the decryption key;

wherein, in response to an access request to the electronic data item, the access request containing the identification information item of the electronic data item, an identification information item of the user, and an access type, the indirect access right determining unit determines whether an access right specified by the access type is granted, and the decryption key is returned if the access right specified by the access type is granted.

10. An access control method for use in an access control apparatus that controls access to a predetermined resource, comprising:

a further user detecting step of detecting, based on entity user relationship definition information defining a predetermined relationship of a user attempting to access the predetermined resource with a further user which is different from the user attempting to access, the further user with which the user has the predetermined relationship, and storing a result of the detecting in a computer memory;

an indirect access right determining step of determining an access right of the user based on the predetermined relationship with the further user detected in the further user detecting step and indirect access control information defining an access right to the predetermined resource based on the predetermined relationship, and storing a result of the detecting in the computer memory;

a direct access right determining step of determining the access right of the user based on the direct access control information; and accessing the predetermined resource in accordance with a result of the direct access right determining step, wherein, in the indirect access right determining step, the access right of the user is determined based on an access right of the further user which further user access right is determined based on direct access control information defining the access right to the predetermined resource on a per user basis or on a per user category basis, and wherein, if a determination result in the direct access right determining step is negative, the access right of the user is determined in the indirect access right determining step.

11. The access control method as claimed in claim 10, wherein, in the indirect access right determining step, the access right that is granted to the further user based on the direct access control information is granted to the user.

12. The access control method as claimed in claim 11, wherein, if the indirect access control information defines that the same access right as the access right granted to the further user is granted to the user based on the predetermined relationship of the user with the further user, the access right that is granted to the further user based on the direct access control information is granted to the user in the indirect access right determining step.

13. The access control method as claimed in claim 10, wherein the access right granted to the further user based on the direct access control information is recognized in the indirect access right determining step by querying for the access right granted to the further user.

14. The access control method as claimed in claim 10, wherein the user relationship definition information defines the relationship between the user and the further user based on a structure of an organization to which the user and further user belong.

15. The access control method as claimed in claim 14, wherein the relationship between the user and the further user may include at least one of a relationship between a boss and a subordinate thereof, a relationship between a secretary and a boss thereof, and a relationship between a deputy and a person for whom the deputy acts.

16. A tangible computer readable medium having stored thereon an access control program that causes a computer to control access to a predetermined resource, the program causing the computer to execute:

a further user detecting step of detecting, based on user relationship definition information defining a predetermined relationship of a user attempting to access the predetermined resource with a further user which is different from the user attempting to access, the further user with which the user has the predetermined relationship;

an indirect access right determining step of determining an access right of the user based on the predetermined relationship with the further user detected in the further user detecting step and indirect access control information defining an access right to the predetermined resource based on the predetermined relationship; and a direct access right determining step of determining the access right of the user based on the direct access control information, wherein, in the indirect access right determining step, the access right of the user is determined based on an access right of the further user which further user access right is determined based on direct access control information defining the access right to the predetermined resource on a per user basis or on a per user category basis, and wherein, if a determination result in the direct access right determining step is negative, the access right of the user is determined in the indirect access right determining step.

* * * * *